US010099697B2

(12) United States Patent
Tatourian et al.

(10) Patent No.: US 10,099,697 B2
(45) Date of Patent: *Oct. 16, 2018

(54) TECHNOLOGIES FOR ASSISTING VEHICLES WITH CHANGING ROAD CONDITIONS

(71) Applicant: Intel Corporation, Santa Clara, CA (US)

(72) Inventors: Igor Tatourian, Santa Clara, CA (US); Rita H. Wouhaybi, Portland, OR (US); Hong Li, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,924

(22) Filed: Jan. 24, 2017

(65) Prior Publication Data
US 2017/0129491 A1 May 11, 2017

Related U.S. Application Data

(63) Continuation of application No. 14/671,755, filed on Mar. 27, 2015, now Pat. No. 9,550,495.

(51) Int. Cl.
*B60W 30/188* (2012.01)
*B60W 10/06* (2006.01)
(Continued)

(52) U.S. Cl.
CPC .......... *B60W 30/188* (2013.01); *B60W 10/06* (2013.01); *B60W 50/14* (2013.01);
(Continued)

(58) Field of Classification Search
CPC .... B60W 30/188; B60W 10/06; B60W 50/14; B60W 2420/52; B60W 2420/54;
(Continued)

(56) References Cited

U.S. PATENT DOCUMENTS 6,754,580 B1 6/2004 Ask et al.
7,082,359 B2 7/2006 Breed
(Continued)

FOREIGN PATENT DOCUMENTS

JP 2004-205348 7/2004
KR 10-2008-0097896 11/2008

OTHER PUBLICATIONS

International Search Report for PCT Application No. PCT/US2016/019780, dated May 30, 2016, 3 pages.
(Continued)

*Primary Examiner* — Gertrude Arthur Jeanglaud
(74) *Attorney, Agent, or Firm* — Barnes & Thornburg LLP

(57) ABSTRACT

Technologies for assisting vehicles with changing road conditions includes vehicle assistance data based on crowd-sourced road data received from a plurality of vehicles and/or infrastructure sensors. The crowd-sourced road data may be associated with a particular section of roadway and may be used to various characteristics of the roadway such as grade, surface, hazardous conditions, and so forth. The vehicle assistance data may be provided to an in-vehicle computing device to assist or facilitate traversal of the roadway.

20 Claims, 7 Drawing Sheets

(51) Int. Cl.
*B60W 50/14* (2012.01)
*B60T 8/32* (2006.01)

(52) U.S. Cl.
CPC ..... *B60W 2420/52* (2013.01); *B60W 2420/54* (2013.01); *B60W 2550/14* (2013.01); *B60W 2550/408* (2013.01); *B60W 2560/02* (2013.01); *B60W 2750/40* (2013.01)

(58) Field of Classification Search
CPC ....... B60W 2550/14; B60W 2550/408; B60W 2560/02; B60W 2750/40
USPC .......................................................... 701/93
See application file for complete search history.

(56) References Cited

U.S. PATENT DOCUMENTS

| | | |
|---|---|---|
| 9,550,495 B2 * | 1/2017 | Tatourian ............ B60W 30/143 |
| 2008/0275629 A1 | 11/2008 | Yun |
| 2012/0065871 A1 | 3/2012 | Deshpande et al. |
| 2013/0063282 A1 | 3/2013 | Baldwin et al. |
| 2014/0279707 A1 | 9/2014 | Joshua |

OTHER PUBLICATIONS

Written Opinion for PCT Application No. PCT/US2016/019780, dated May 30, 2016, 9 pages.

\* cited by examiner

TECHNOLOGIES FOR ASSISTING VEHICLES WITH CHANGING ROAD CONDITIONS

CROSS-REFERENCE TO RELATED U.S. PATENT APPLICATION

The present application is a continuation application of U.S. application Ser. No. 14/671,755, entitled "TECHNOLOGIES FOR ASSISTING VEHICLES WITH CHANGING ROAD CONDITIONS," which was filed on Mar. 27, 2015.

BACKGROUND

Many modern vehicles, including luxury vehicles, include one or more in-vehicle computing systems to improve the experience of the occupants. The in-vehicle computing systems may include various sensors to obtain many different types of information about the vehicle, such as, for example, temperature sensors, tire pressure sensors, cameras, radars, lidars, oil pressure sensors, fuel tank sensors, speed sensors, and others. The vehicle sensors cooperate to provide information to the driver and to allow the in-vehicle computing system to improve the experience of driving the vehicle. However, such information is typically based only on the sensor data generated by the sensors of that particular vehicle, which may be limited to the past operation of the vehicle.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
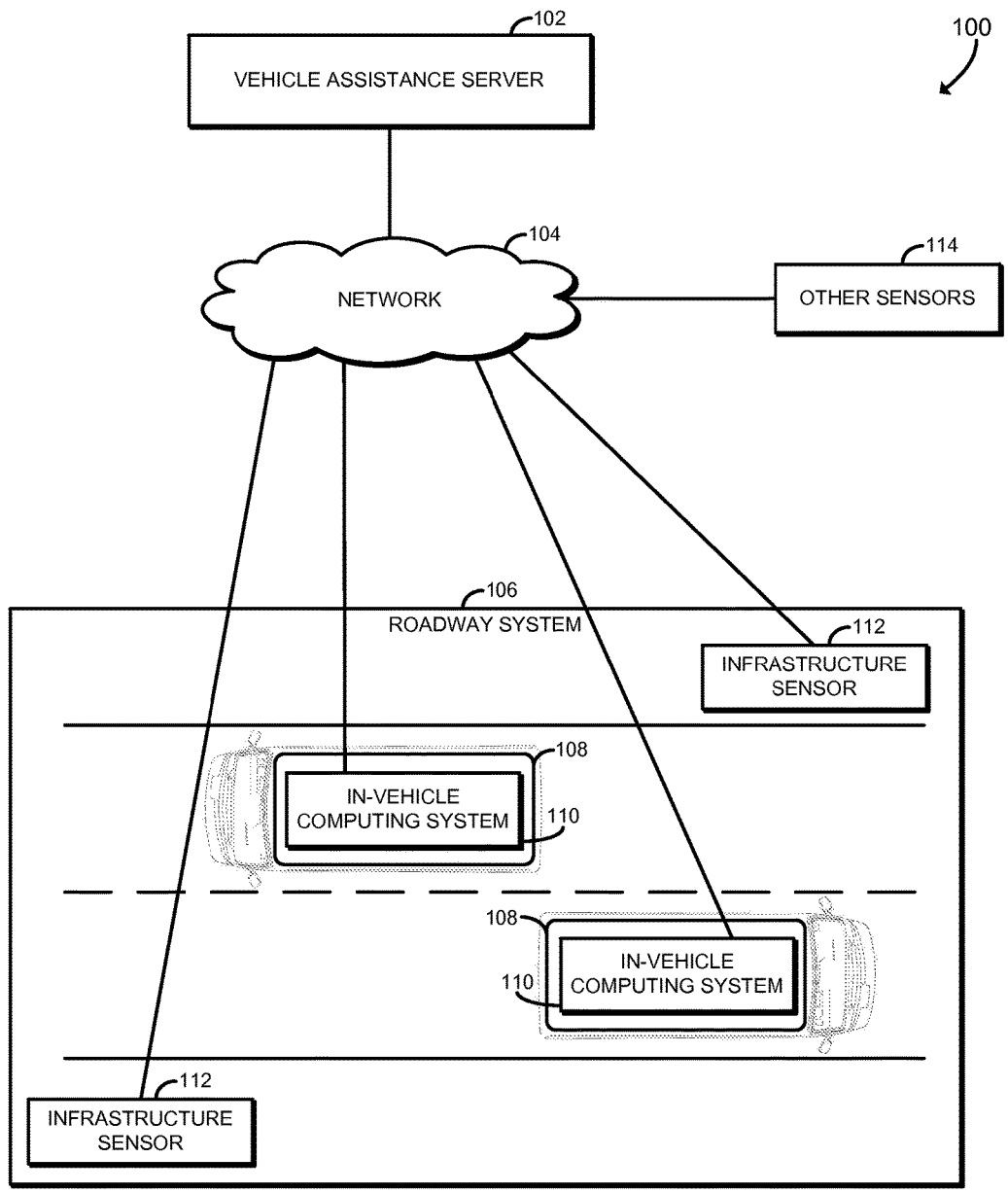
FIG. 1 is a simplified block diagram of at least one embodiment of a vehicle assistance system for generating vehicle assistance data.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for collecting crowd-sourced road data and assisting vehicles with changing road conditions is shown. The system 100 includes a vehicle assistance server 102 connected to a roadway system 106. The roadway system 106 may include one or more in-vehicle computing systems 110, one or more infrastructure sensors 112, and other sensors 114. The vehicle assistance server 102 is connected to the in-vehicle computing systems 110, the infrastructure sensors 112, and the other sensors 114 through a network 104. While the illustrative embodiment of FIG. 1 includes two in-vehicle computing systems 110 and two infrastructure sensors 112, it should be appreciated that any number of in-vehicle communication systems 110 or infrastructures sensors 112 may be connected to the vehicle assistance server 102. The network 104 may be any type of communication network and may be configured to use any one or more communication technology (e.g., wired or wireless communications) and associated protocols (e.g., Ethernet, Bluetooth®, Wi-Fi®, WiMAX, etc.) to effect such communication.

Each in-vehicle computing system 110 is associated with a vehicle 108. The vehicles 108 may be embodied as any type of vehicle that can travel along a road and may include gasoline-powered cars, diesel-powered cars, natural gas powered vehicles, electric vehicles, all-terrain vehicles, motorcycles, and other types of vehicles. In some embodiments, a vehicle 108 may be embodied as a type of vehicle that is not capable of traveling down a roadway, such as, for example, a boat, an airplane, a train, or a drone. The infrastructure sensors 112 may be embodied as any type of sensor associated with a roadway system 106 that is not part of a vehicle 108. The infrastructure sensors 112 may include, for example, traffic cameras, weather sensors, location sensors, speed sensors, and other sensors. Other sensors 114 include any type of sensor used by the vehicle assistance system 100 to obtain road data. For example, other types of sensors 114 may include cameras and other sensors attached to drones (or other aircraft) used to monitor the roadways.

In current vehicle systems, cooperation between in-vehicle computing systems 110 traveling on the same road is nearly non-existent. Consequently, many of the systems built into a vehicle are purely reactionary to the changing road conditions encountered by the vehicle 108, despite the fact that other vehicles may have just moments before experienced the same road condition. For example, when a vehicle 108 operating under a cruise control system begins to climb a hill of the road, the cruise control system will not change the throttle of the vehicle 108 until the vehicle 108 has slowed sufficiently to trigger the cruise control feedback systems. These delays between changing road conditions, such as an uphill grade in the road, and the cruise control applying more throttle of the vehicle 108, can cause the occupants of the vehicle 108 to experience a jerky movement when the vehicle 108 suddenly gears down.

In another example, a vehicle 108 may predict a distance until the vehicle 108 will need to be refueled or recharged. Present refueling distance estimates do not take into consideration uphill grades and downhill grades of the roads. Estimated refuel distances may vary wildly as the vehicle 108 travels through hilly country. For example, a distance-to-empty prediction of vehicle 108 might report that the vehicle 108 has 10 miles till a refueling while the vehicle 108 is going uphill, but when the vehicle 108 comes back downhill the distance-to-empty prediction might report that the vehicle 108 has 200 miles till refueling is necessary. These changes in the refueling distance prediction data can cause refueling anxiety in the operators of vehicles.

The vehicle assistance system 100 provides a way to collect crowd-sourced road data from a roadway system 106, analyze road data, and feed vehicle assistance data to individual vehicles to allow a vehicle 108, and the vehicle's driver, to proactively control the vehicle 108, rather than reactively control the vehicle 108. For example, with crowd-sourced road data, a vehicle assistance server 102 may be configured to inform a cruise control system of a vehicle 108 that an uphill portion of the road is coming and to apply additional throttle to the vehicle 108 before the uphill grade is encountered. In another example, the vehicle assistance server 102 may use the crowd-sourced road data to allow a vehicle 108 to have a more accurate distance-to-empty estimate by alerting the vehicle 108 of the approaching uphill-grades and downhill grades. By so doing, the in-vehicle computing system 110 may be able to more accurately generate a distance-to-empty prediction using the information about what the ultimate change in elevation will be along the road. In some embodiments, the vehicle assistance server 102 calculates the vehicle's 108 distance-to-empty estimate based on information received from the in-vehicle computing system 110. The vehicle assistance system 100 allows the vehicle's 108 control systems and prediction systems to be proactive, rather than merely reactive, when faced with changing road conditions, such as, for example, changes in road grade, changes in road surface, or changes in weather conditions.

Figure 2:
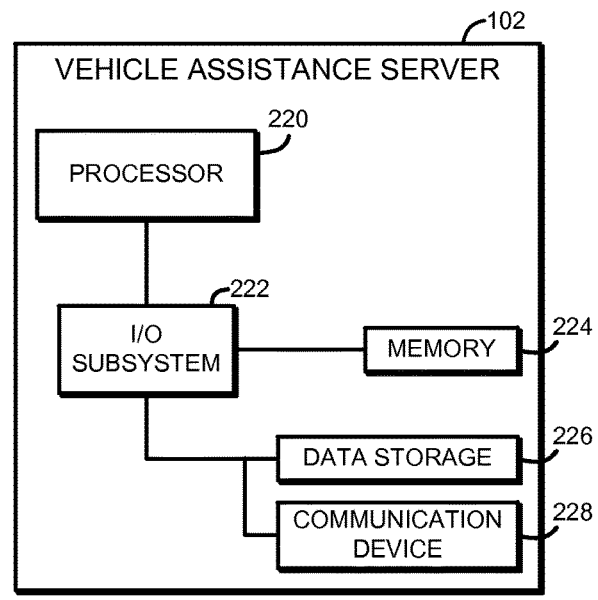
FIG. 2 is a simplified block diagram of at least one embodiment of vehicle assistance server of the system of FIG. 1.

An illustrative embodiment of the vehicle assistance server 102 is shown in FIG. 2. The vehicle assistance server 102 is configured to collect crowd-sourced road data and generate vehicle assistance data for vehicles 108 traveling down a road 106. The vehicle assistance server 102 includes a processor 220, an I/O subsystem 222, a memory 224, and a data storage device 226. The server 102 may be embodied as any type of computation or computer device capable of performing the functions described herein, including, without limitation, a computer, a multiprocessor system, a server, a rack-mounted server, a blade server, a laptop computer, a notebook computer, a network appliance, a web appliance, a distributed computing system, a processor-based system, and/or a consumer electronic device. Of course, the server 102 may include other or additional components, such as those commonly found in a server device (e.g., various input/output devices), in other embodiments. Additionally, in some embodiments, one or more of the illustrative components may be incorporated in, or otherwise form a portion of, another component. For example, the memory 224, or portions thereof, may be incorporated in the processor 220 in some embodiments.

The processor 220 may be embodied as any type of processor capable of performing the functions described herein. For example, the processor 220 may be embodied as a single or multi-core processor(s), digital signal processor, microcontroller, or other processor or processing/controlling circuit. Similarly, the memory 224 may be embodied as any type of volatile or non-volatile memory or data storage capable of performing the functions described herein. In operation, the memory 224 may store various data and software used during operation of the server 102 such as operating systems, applications, programs, libraries, and drivers. The memory 224 is communicatively coupled to the processor 220 via the I/O subsystem 222, which may be embodied as circuitry and/or components to facilitate input/output operations with the processor 220, the memory 224, and other components of the server 102. For example, the I/O subsystem 222 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 222 may form a portion of a system-on-a-chip (SoC) and be incorporated, along with the processor 220, the memory 224, and other components of the server 102, on a single integrated circuit chip.

The data storage device 226 may be embodied as any type of device or devices configured for short-term or long-term storage of data such as, for example, memory devices and circuits, memory cards, hard disk drives, solid-state drives, or other data storage devices. The data storage device 226 may store compressed and/or decompressed data processed by the server 102.

The server 102 may also include a communication subsystem 228, which may be embodied as any communication circuit, device, or collection thereof, capable of enabling communications between the server 102 and other remote devices over a computer network, such as, for example, in-vehicle computing systems 110. The communication subsystem 228 may be configured to use any one or more communication technology (e.g., wired or wireless communications) and associated protocols (e.g., Ethernet, Bluetooth®, Wi-Fi®, WiMAX, etc.) to effect such communication. The server computing device can include other peripheral devices as might be necessary to perform the functions of the server, such as displays, keyboards, other input/output devices, and other peripheral devices.

The vehicle assistance server 102 may be connected to one or more infrastructure sensors 112 or other sensors 114. The infrastructure sensors 112 and the other sensors 114 may be embodied as any type of computation or computer device capable of performing the function described herein. The infrastructure sensors 112 may include any sensor that measures a condition or otherwise generates sensor data that is relevant to or indicative of a condition of the road. For example, the infrastructure sensors 112 may include traffic cameras, weather sensors such as precipitation sensors and temperature sensors, speed sensors, vibration sensors, wind speed sensors, and other types of sensors. Other types of sensors 114 used to measure conditions of the roadway system 106 may include cameras and radars on aircraft, such as drones. The sensors 112, 114 are configured to detect road conditions, and may include, for example, cameras, motion sensors, temperature sensors, radar, microphones, location sensors, and other sensing devices.

Figure 3:
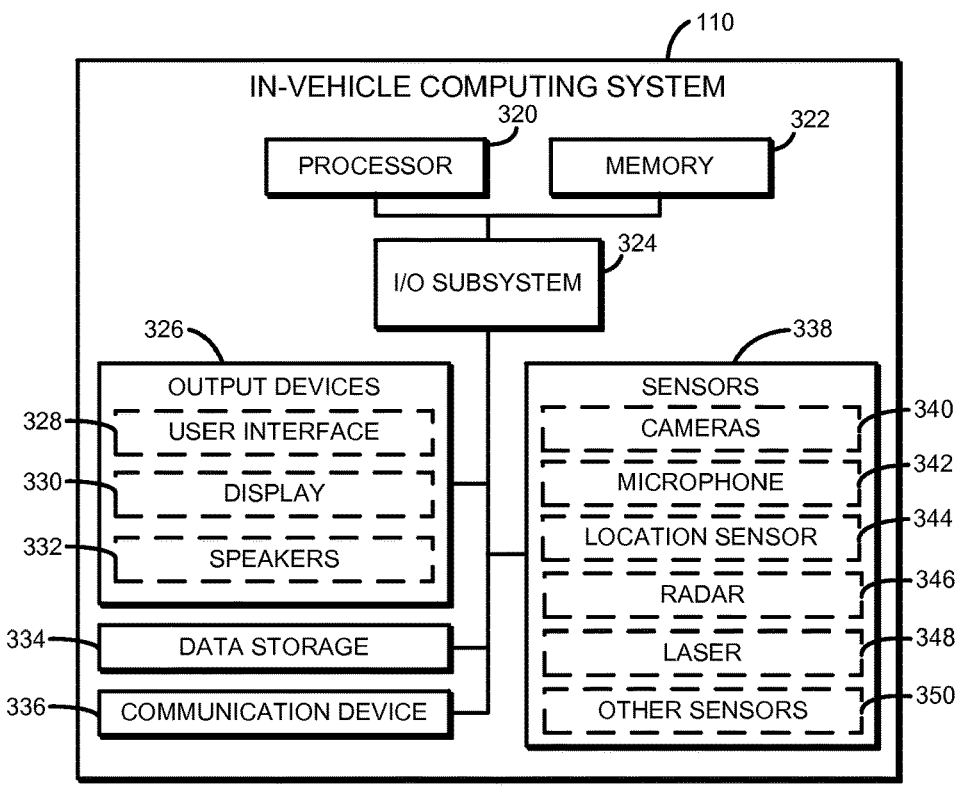
FIG. 3 is a simplified block diagram of at least one embodiment of an in-vehicle computing system of the system of FIG. 1.

An illustrative embodiment of the in-vehicle computing system 110 is shown in FIG. 3. The in-vehicle computing system 110 is configured to sense conditions associated with the vehicle 108 and to adjust vehicle parameters based on the vehicle assistance data received by the vehicle assistance server 102. The in-vehicle computing system illustratively includes a processor 320, a memory 322, an I/O subsystem 324, a data storage device 334, and a communication device 336. The in-vehicle computing system 110 may be embodied as any type of computation or computer device capable of performing the functions described herein, including, without limitation, a computer, a multiprocessor system, a server, a rack-mounted server, a blade server, a laptop computer, a notebook computer, a network appliance, a web appliance, a distributed computing system, a processor-based system, and/or a consumer electronic device. In general, components of the in-vehicle computing system 110 having the same or similar names to components of the server 102 described above and may be embodied similarly. As such, a discussion of those similar components is not repeated here.

An illustrative embodiment of the in-vehicle computing system 110 includes output devices 326, data storage device 334, communication device 336, and sensors 338. The output devices 326 may include a user interface 328, a display 330, speakers 332, and/or other output devices (e.g., vehicle control devices). As discussed below, the output devices 326 may be used to notify the driver of the content of vehicle assistance data received from the vehicle assistance server. Additionally, in some embodiments, the in-vehicle computing system 110 may control one or more output devices 326 to automatically adjust a vehicle parameter, in response to receiving vehicle assistance data that includes a vehicle control command. A vehicle parameter may be embodied as any feature or condition of the vehicle that is adjustable by the in-vehicle computing system 110, for example, the throttle of the vehicle 108 during cruise control. A vehicle control command is generated when the vehicle assistance server 102 determines a vehicle parameter that may be altered to improve the driving experience and the vehicle assistance server 102 determines that the vehicle parameter may be altered by the in-vehicle computing system 110 without input from the driver. For example, if the vehicle assistance server 102 determines that the vehicle 108 is approaching an uphill grade in the road, a vehicle control command may be sent to the vehicle 108 to increase the throttle of the vehicle 108 before the vehicle 108 gets to the hill, thereby ensuring a smooth and fast ride up the road grade.

The user interface 328 may include any combination of input/output devices, such as, for example, buttons or a computer touchscreen. Input devices of the in-vehicle computing system 110 may include a touchpad or buttons, a compatible computing device (e.g., a smartphone or control unit), speech recognition, gesture recognition, eye tracking, or a brain-computer interface. The display 330 may be embodied as any type of display such as, for example, a vehicle mounted display. The speakers 332 may provide auditory outputs to the driver of the vehicle 108, and may generate a variety of sounds that represent a specific event. In some embodiments, the in-vehicle computing system 110 may also include any tactile or olfactory outputs as is necessary to change vehicle parameters or notify the driver of changing conditions. The output devices 326 discussed above (user interface 328, display 330, or speakers 332) are only discussed as optional embodiments, and additional or other output devices may be present.

The in-vehicle computing system 110 also includes sensors 338 configured to sense or measure vehicle operational data and/or road condition data. In some embodiments, one or more cameras 340 can be coupled to the in-vehicle computing system 110 to capture one or more aspects of the roadway. For example, some vehicles 108 may include cameras that monitor striping on the surface of the road, thereby allowing the in-vehicle computing system to assist the driver in staying within a lane of traffic. In another example, a camera 340 may be used as a gaze detector to determine where the driver of the vehicle 108 is looking while driving. A microphone 342 can also be included in the in-vehicle computing system 110 to capture sounds made by the vehicle 108 or the driver, for example, voice commands by the driver or the microphone may pick up road noise and engine noise from which the in-vehicle computing system 110 may determine the speed of the vehicle 108.

The in-vehicle computing system 110 may also include a location sensor 344 to determine the location of the vehicle 108. The vehicle assistance server 102 uses the location data, measured by the location sensor 344, to determine the location of the vehicle 108 and, for example, which road the vehicle 108 is driving down. The location of sensed data is useful in building a crowd-sourced database of road data. Additionally, the sensors 338 may include a radar 346 coupled to the in-vehicle computing system 110 to measure the speed of the vehicle 108 and the distance of the vehicle 108 from other objects, such as other vehicles. The in-vehicle computing system 110 may also include lasers 348 to be used to determine various things about the vehicle 108. For example, the laser 348 may be a lidar for determining the distance between the vehicle 108 and other vehicles using the road.

Of course, the in-vehicle computing system 110 may include other sensors for determining a variety of things about the vehicle 108 and/or the road. For example, in some embodiments, the sensors 338 may include an accelerometer to measure motion of the vehicle 108, a monitor to measure brain activity of the driver, or a monitor to measure the temperature of the driver. Other sensors may include tire pressure sensors, a blind spot monitor, an air-fuel ratio meter, a crankshaft position sensor, a curb feeler to warn a driver of curbs, an engine coolant temperature sensors to measure the engine temperature, a hall effect sensor, a manifold absolute pressure sensor to regulate fuel metering, a mass flow sensors, an oxygen sensor to measure the amount of oxygen in the exhaust, parking sensors to alert the driver of obstacles during parking maneuvers, a radar gun, a speedometer, a throttle position sensor, a torque sensor, a transmission fluid temperature sensor, a turbine speed sensor, a variable reluctance sensor, a water sensor, a wheel speed sensor, a coolant level sensor, an air cleaner temperature sensor, a barometric pressure sensor, a detonation sensor to determine whether in the engine is knocking, an ambient air temperature sensor, a heater core temperature sensors, an oil temperature sensor, a transmission shift position sensor, an EGR pressure feedback sensor, an accelerator pedal position sensor, a brake pedal position sensor, a transmission output speed sensor, a turbo boost sensor, an acceleration sensor, a brake fluid level sensor, a washer fluid level sensor, a vehicle height sensor, a rear wheel level sensor, a steering rate sensor, a tail light outage sensor, an EGR valve position sensor, an occupant determination sensor (e.g., a weight sensor in one or seats of the vehicle), a cargo weight determination sensor, a battery-life determination sensor, an electricity generation sensor to determine the electrical output of the alternator of the vehicle, a gyroscope, or an ambient light sensor. As such, it should be appreciated that the specific sensors 338 discussed above (camera 340, microphone 342, location sensor 344, radar 346, laser 348, or other sensors 350) are only discussed as possible or optional embodiments, and additional or other sensors may be incorporated into the in-vehicle computing system 110.

Figure 4:
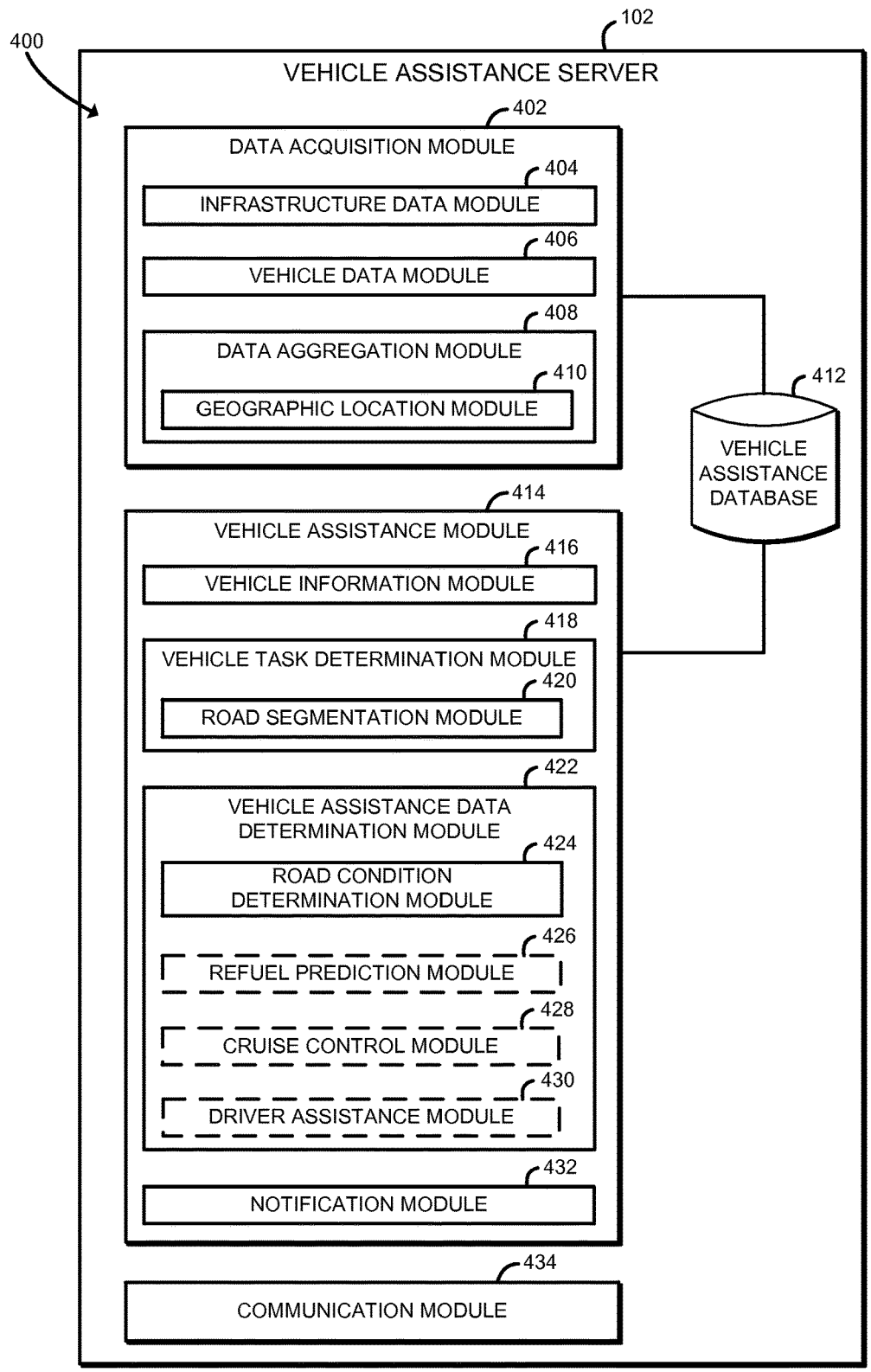
FIG. 4 is a simplified block diagram of at least one embodiment of an environment that may be established by the vehicle assistance server of FIG. 2.

Referring to FIG. 4, in the illustrative embodiment, the vehicle assistance server 102 establishes an environment 400 during operation. The illustrative embodiment 400 includes a data acquisition module 402, a vehicle assistance module 414, and a communication module 434. In use, the vehicle assistance server 102 is configured to collect and aggregate crowd-sourced road data, collect vehicle profile information related to a specific trip of a vehicle 108, and determine vehicle assistance data, based on the crowd-sourced road data and the vehicle profile information, to assist the vehicle 108 in its operation. The various modules of the environment 400 may be embodied as hardware, firmware, software, or a combination thereof. For example the various modules, logic, and other components of the environment 400 may form a portion of, or otherwise be established by, the processor 220 or other hardware components of the server 102. As such, in some embodiments, any one or more of the modules of the environment 400 may be embodied as a circuit or collection of electrical devices (e.g., a data acquisition circuit, a vehicle assistance circuit, a communication circuit, etc.).

The data acquisition module 402 is configured to collect and organize crowd-sourced road data from a variety of sources. Crowd sourcing data involves sensing large amounts of data to collect a large enough data set to determine related information. For example, by tracking the geographic location, including elevation, of hundreds of vehicles traveling down a particular road, a computing system will be able to more accurately determine the road grade at any particular point of the road. While the road grade is not measured directly, the road grade can be determined by other information collected through crowd-sourcing. The data acquisition module 402 includes an infrastructure data module 404, a vehicle data module 406, and a data aggregation module 408.

The infrastructure data module 404 is configured to receive data from one or more infrastructure sensors 112 and other sensors 114. Infrastructure sensors 112 sense data at locations on or near a road. For example, the infrastructure sensors 112 may collect information that can be used to determine one or more road conditions, such as road grade, road surface type, or other road hazards (e.g., traffic jams or vehicle collisions). The infrastructure data module 404 receives the infrastructure data and stores the infrastructure data in a vehicle assistance database 412.

The vehicle data module 406 is configured to receive vehicle data from one or more vehicles 108. The vehicle data may include vehicle identification data, vehicle operation data, and/or driver profile data. The vehicle identification data may include permanent information about the vehicle, such as, for example, make, model, year, engine specifications, what sensors are available on the vehicle 108, what control systems are operative on the vehicle, and other information. The vehicle identification data also may include information about past performance of the vehicle 108 including, for example, historical data regarding miles-per-gallon, historical data about roads usually driven, and other long-term trends that can be measured by an in-vehicle computing system 110. In some embodiments, the vehicle assistance server 102 may generate probabilistic models based on the past performance of the vehicle 108 to determine a probability of future performance or behaviors of the vehicle 108. For example, a probabilistic model may indicate the probabilities that the vehicle 108 is going to take one or more particular routes based on past routes taken by the vehicle.

The vehicle operation data of the vehicle data may include data about present operational characteristics of the vehicle 108, such as data related to the specific trip the vehicle 108 is currently traveling. For example, the vehicle operational data may include route information, if the driver has entered a destination. In another example, the vehicle operation data may include the weight of the vehicle 108 (including passengers and gear), the current location of the vehicle 108, the current speed of the vehicle 108, the current direction of travel of the vehicle 108, and other information. The driver profile information may include information about the driver, such as, for example, whether the driver is an aggressive or reserved driver. Driver profile data is not always available and may not always be included in the vehicle profile information or the vehicle data. In some embodiments, the driver profile data may include information related to more than one driver of the vehicle 108. For example, a vehicle 108 may have a plurality of potential drivers, but two primary drivers. In this example, the driver profile data will include information about all of the potential drivers of the vehicle 108 (e.g., the driving style of each driver), and the driver profile data will identify which driver is currently operating the vehicle 108.

The data aggregation module 408 collects all of the received data, including the infrastructure data from the infrastructure data module 404 and the vehicle data from the vehicle data module 406, and aggregates, or organizes, the collected data into a searchable database (i.e., crowd-sourced road data). Once the collected road data has been organized, the aggregated road data is stored in a vehicle assistance database 412. In some embodiments, the data aggregation module 408 includes a geographic location module 410 to determine the location of each piece of data collected and correlate that collected data with locations on a navigation map. For example, crowd-sourced road data on the vehicle assistance database 412 may be indexed by the location at which the road data was collected. Indexing the collected road data by location allows the data acquisition module 402 to create navigational map full of additional information, such as road grade, road surface and traction, local weather information, or even particular road hazards. In some embodiments, the data aggregation module 408 segments the road into road segments based upon the received crowd-sourced data. For example, a road segment might be defined as a road section having an uphill grade, while an adjoining road segment might be defined as a road section having a downhill grade. Additionally, in some embodiments, the data aggregation module may generate, update, or otherwise maintain one or more probabilistic models based on the crowd-sourced road data, which may be used to predict operation or behavior of a vehicle currently traveling the corresponding road.

In some embodiments, the crowd-sourced road data includes information about when the crowd-sourced road data was sensed or received. Road data that is sensed more recently may be generally more relevant to current road conditions than older road data. As crowd-sourced road data ages, the information reflected in the crowd-sourced road data might not be as accurate as it used to be. For example, if the crowd-sourced road data indicates that the road surface is slippery due to snow, that information is likely not relevant six months later. As such, in some embodiments, the data aggregation module 408 may be configured to apply weighting factors to the collected road data used to generated crowd-sourced road data based on the date the road data was collected. For example, data collected from vehicle sensors and infrastructure sensors one week ago may be given more weight than data collected one month ago. Additionally, road data that has aged beyond a threshold time may be completely discarded in some embodiments.

The vehicle assistance database 412 is configured to store any information associated with the vehicle assistance system 100. In particular, the vehicle assistance database 412 may store the crowd-sourced road data collected by the data acquisition module 402. The vehicle assistance database 412 is connected to the vehicle assistance module 414 and is configured to provide information to the vehicle assistance module 414 to facilitate the determination of the vehicle assistance data. The vehicle assistance database 412 may be embodied as part of the vehicle assistance server 102, or may be external to the server 102 and connected to the server 102 through one or more computer networks. In some embodiments, the vehicle assistance database 412 is the data storage device 226.

The vehicle assistance module 414 is configured to determine vehicle assistance data for a vehicle 108 traveling along a road based on current vehicle profile information and crowd-sourced road data stored in the vehicle assistance database 412. The vehicle assistance module 414 includes a vehicle information module 416, a vehicle task determination module 418, a vehicle assistance data determination module 422, and a notification module 432.

The vehicle information module 416 is configured to receive current vehicle profile information. In some embodiments, the vehicle information module 416 receives vehicle profile information from a vehicle 108 while the vehicle 108 is located on the first road segment. As discussed above, the vehicle profile information may include vehicle identification data, vehicle operational data, and/or driver profile data. The vehicle information module 416 is configured to receive and organize the vehicle profile information into a useful format for the vehicle assistance module 414. For example, the vehicle information module 416 may determine the capabilities of the vehicle 108, such as, for example, whether the vehicle 108 is capable of cruise control, whether the vehicle 108 is capable of driverless operations, or whether the in-vehicle computing system 110 is capable of any automatic control features. Another example of information that the vehicle information module 416 may determine is the current location of the vehicle, the speed of travel of the vehicle 108, the direction of travel of the vehicle 108, and what road the vehicle 108 is traveling along. Other types of information that may be determined are who is driving the vehicle 108, how passengers are in the vehicle 108, the weight of passengers and cargo in the vehicle 108, and other factors that might affect the performance of the vehicle 108.

The vehicle task determination module 418 is configured to receive current vehicle information from the vehicle information module 416 and determine which tasks the vehicle assistance server 102 is capable of assisting the vehicle 108 with. For example, not all vehicles are equipped with all features. Luxury cars usually have a number of advanced control features that are not present on lower-end car models or older car models. The vehicle task determination module 418 determines the capabilities of each vehicle using the vehicle assistance system 100. For example, the vehicle task determination module 418 may determine that a luxury vehicle is capable of using certain advanced driver assistance systems, while an older vehicle is only capable of using standard cruise control systems. When the vehicle task determination module 418 determines which tasks the vehicle 108 is capable of performing, it generates a task list, and the vehicle assistance data determination module 422 only generates vehicle assistance data related to that task list. In some embodiments, the vehicle task determination module 418 includes a road segmentation module 420 to segment the road being traveled by the vehicle 108 into road segments. The road segmentation module 420 uses the current vehicle information to break the road into sections according to the tasks to be performed by the vehicle assistance system 100.

The vehicle assistance data determination module 422 is configured to determine vehicle assistance data for any number of vehicles 108 using any number of roads based on the crowd-sourced road data. For example, the vehicle assistance data may include vehicle control commands and driver notifications. The vehicle control commands may be embodied as a signal that causes the in-vehicle computing system 110 to automatically adjust a vehicle parameter. For example, a vehicle control command may be embodied as a command for the in-vehicle computing system 110 to increase the throttle of the vehicle's cruise control system, in anticipation of an upcoming uphill grade. The driver notifications may be embodied as any type of notification transmitted to the driver by the vehicle assistance server 102. For example, if the vehicle 108 is not in a cruise control mode, the driver notification might inform that driver that an uphill grade of the road is approaching, and suggest that the driver increase the throttle of the engine to increase the power of the engine. Another example of a driver notification may include vehicle assistance data that dynamically updates the distance-to-empty prediction based on upcoming changes in the road grade, and outputs that updated distance-to-empty prediction to the driver.

The vehicle assistance data is usable by an in-vehicle computing device 110 of the vehicle 108 to facilitate traversal of a road by the vehicle 108. The vehicle assistance data determination module 422 may include a road condition determination module 424, a refuel prediction module 426, a cruise control module 428, and a driver assistance module 430. Of course, in other embodiments, the vehicle assistance data determination module 422 may include additional or other modules.

The road condition determination module 424 is configured to use the crowd-sourced road data from the vehicle assistance database 412 to determine one or more conditions of the road. The conditions of the road may include road grades, road surface types, or road hazards. The road condition determination module 424 may determine the grade of a road by correlating map data with location data obtained from one or more vehicles 108 driving on the road. Once the road grade of the road is determined, the road condition determination module 424 generates road grade data for the road. The road condition determination module 424 may also determine road surface data indicative of the characteristics of the surface of the road. The characteristics of the road surface may include the road type (e.g., whether the road is paved with concrete or asphalt, or whether the road is dirt) and whether the road surface is being affected by environment factors, such as rain, snow, or ice. The road condition determination module 424 may use weather data collected from one or more infrastructure sensors 112 or one or more in-vehicle computing systems 110 to determine if environmental conditions are affecting the quality of the road surface for driving. The road condition determination module 424 may also determine road hazard data indicative of one or more dangerous conditions of the road. One or more hazardous conditions of the road may include potholes, traffic congestion, a vehicle collision, slippery conditions, an animal on the road (e.g., a deer), or other hazards.

Once the road condition data is determined, the vehicle assistance data determination module 422 generates vehicle assistance data for each vehicle 108 using the vehicle assistance system 100. The vehicle assistance is tailored to each individual vehicle by using the vehicle profile information to determine what response should be taken by the vehicle 108 to a road hazard. For example, if a vehicle 108 hauling a heavy load is approaching a steep uphill grade in the road, the vehicle assistance data may indicate that the vehicle 108 get into the right hand lane, gear down to a lower gear, and turn on the vehicle's 108 hazard flashers to alert other drivers of the reduced speed of the vehicle 108. In another example, if the road condition data indicates that a particular road is very slick, and the vehicle 108 does not have four-wheel drive, the vehicle assistance data may indicate that the vehicle 108 should consider taking an alternative route. In some embodiments, the vehicle assistance data is usable by an in-vehicle computing device 110 of the vehicle 108 to facilitate traversal of a road segment by the vehicle 108.

In some embodiments, the vehicle assistance data determination module 422 considers information for nearby vehicles participating in the vehicle assistance system 100 when generating vehicle assistance data for individual vehicles 108. For example, the vehicle assistance data determination module 422 may consider traffic information when determining individual vehicle determination data. For example, if a fast vehicle is approaching a slow vehicle, the vehicle assistance data may indicate, through a driver notification, to the slow vehicle to move over to be courteous to the fast vehicle. In another example, the vehicle assistance data determination module 422 may receive information from one vehicle 108 that a pothole exists on the road. Using that information, the vehicle assistance data generated for another vehicle 108 may include a notification about the impending pothole. In this way, the vehicle assistance system 100 facilitates the sharing of the advanced sensing capabilities of luxury vehicles with other vehicles that may not have such advanced sensing capabilities.

The refuel prediction module 426 is configured to improve the distance-to-empty predictions output to the driver of the vehicle 108. The refuel prediction module 426 uses the vehicle profile information, including the vehicle specifications and the vehicle driving history, and the road condition data, determined using the crowd-sourced road data, to more accurately predict the amount of driving distance the vehicle 108 can travel before needing to refuel. For example, if an electric vehicle 108 is traveling along a hilly road, the distance-to-empty prediction may vary wildly depending on whether the vehicle 108 is traveling uphill or downhill. To render more accurate predictions, the vehicle assistance data may include a new distance-to-empty prediction that incorporates road grade data about a certain distance of a predicted route that may be used by the vehicle 108. For example, the new distance-to-empty prediction may include an estimate based on the next ten miles of road, thereby taking into the account the approaching uphill and downhill grades in the road. In some embodiments, the refuel prediction module 426 uses predictive routing to determine along what roads the vehicle 108 is likely to travel next. For example, a typical vehicle 108 usually only travels to a number of finite places, such as between work and home. Using the vehicle's 108 past route data, and past fuel performance along that route (i.e., how much fuel was used by the vehicle 108 while traversing a particular road segment), the refuel prediction module 426 may make an even more accurate distance-to-empty prediction. In some embodiments, the refuel prediction module 426 uses fuel usage data gathered from other vehicles 108 participating in the vehicle assistance system 100 to make a more accurate distance-to-empty prediction. For example, the refuel prediction module 426 may use information from similarly types of vehicles 108 when making a new distance-to-empty prediction (e.g., using the fuel usage from other Nissan vehicles when determining what the distance-to-empty prediction should be for a Nissan Altima). In some embodiments, the refuel prediction module 426 may use the driver profile data to determine whether the driving style of the driver of the vehicle 108 will impact the distance the vehicle 108 may travel before refueling is required. For example, a driver who drives with an aggressive style may have to refuel more frequently due to the decreased miles-to-the-gallon caused by high speeds and frequent acceleration of the vehicle 108.

The cruise control module 428 is configured to generate vehicle control commands related to the cruise control of a vehicle 108. In some embodiments, the cruise control data usable by the in-vehicle computing system 110 of the vehicle 108 to adjust the throttle of the engine of the vehicle 108. For example, if the road condition data indicates that the vehicle 108 is approaching an uphill grade, the cruise control module 428 may generate vehicle assistance data that instructs the vehicle's 108 cruise control system to apply more throttle to the engine before the uphill grade is encountered by the vehicle 108. The cruise control module 428 generates vehicle control commands in anticipation of an impending change in road conditions and allows the occupants of the vehicle 108 to experience smoother ride. In some embodiments, the cruise control module 428 generates cruise control data for road segments that the vehicle 108 is travelling toward, but not yet traversing.

The driver assistance module 430 is configured to generate one or more vehicle control commands related to advanced driver assistance systems. For example, even if a car is not in a cruise control mode, the vehicle assistance data may include a vehicle control command for an advanced driver assistance system of the vehicle 108 to increase the power of the engine the vehicle 108 begins climbing the uphill grade of the road. In another example, driver assistance module 430 may be configured to stiffen the suspension of a vehicle 108 in response to road condition data indicating that a pothole is approaching.

The notification module 432 is configured to generate driver notification outputs to be delivered to the driver of the vehicle 108 in response to generating vehicle assistance data. The driver notifications may be included in the vehicle assistance data when the vehicle assistance data is transmitted to the in-vehicle computing system 110. In some embodiments, a notification is generated for the driver whenever vehicle assistance data is transmitted to the in-vehicle computing system 110. In some embodiments, a notification is not output to the driver of the vehicle 108 when the vehicle assistance data only includes a vehicle control command. Notifications may include suggestions of actions the driver should take when controlling the vehicle 108.

The communication module 434 is configured to allow the vehicle assistance server 102 to communicate with one or more in-vehicle computing systems 110, one or more infrastructure sensors 112, and one or more other sensors 114 over the network 104. The communication module 434 is configured to handle all of the different types of data that is handled by the vehicle assistance server 102, and corresponds to the communication subsystem 228. The communication module 434 may be configured to use any one or more communication technology (e.g., wired or wireless communications) and associated protocols (e.g., Ethernet, Bluetooth®, Wi-Fi®, WiMAX, etc.) to effect such communication.

Figure 5:
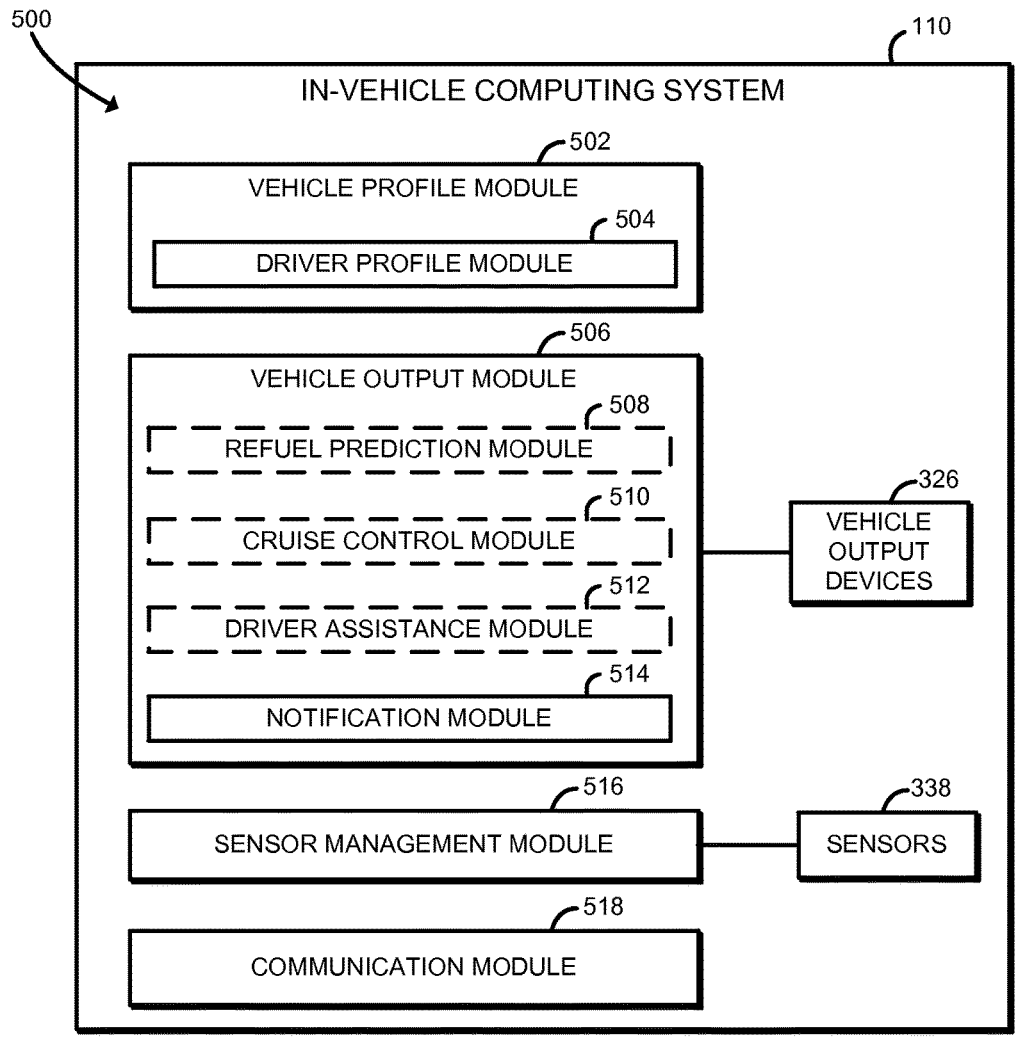
FIG. 5 is a simplified block diagram of at least one embodiment of an environment that may be established by the in-vehicle computing system of FIG. 3.

Referring to FIG. 5, in the illustrative embodiment, the in-vehicle computing system 110 establishes an environment 500 during operation. The illustrative embodiment 500 includes a vehicle profile module 502, a vehicle output module 506, a sensor management module 516, and a communication module 518. In use, the in-vehicle computing system 110 is configured to collect sensor data from the sensors 338, transmit vehicle profile information to the vehicle assistance server 102, receive vehicle assistance data from the vehicle assistance server 102, and modify vehicle outputs based on the vehicle assistance data. The various modules of the environment 500 may be embodied as hardware, firmware, software, or a combination thereof. For example the various modules, logic, and other components of the environment 500 may form a portion of, or otherwise be established by, the processor 320 or other hardware components of the in-vehicle computing system 110. As such, in some embodiments, any one or more of the modules of the environment 500 may be embodied as a circuit or collection of electrical devices (e.g., vehicle profile circuit, a vehicle output circuit, a sensor management circuit, a communication circuit, etc.).

The vehicle profile module 502 is configured to collect, store, and transmit vehicle profile information. Vehicle profile information may include driver profile data, vehicle identification data, and/or vehicle operational data. As discussed above, the vehicle identification data generally includes information about the vehicle 108 that involves permanent characteristics. For example, the vehicle identification data may include the make, model, and year of the vehicle 108, with other specifications of the car as needed. In some embodiments, the vehicle identification data includes long-term historical data about the operation of the vehicle 108, such as overall miles-per-gallon, miles traveled by the vehicle 108, or routes normally taken by the vehicle 108. The vehicle operational data may include any information indicative of an operation of the vehicle 108 while the vehicle 108 traverses a road segment, or, in other words, while the vehicle 108 is engaged in a specific trip to a specific destination. The vehicle operational data generally includes the data collected by the sensors 338 during the operation of the vehicle 108 during the specific trip. For example, the vehicle operational data may include the current location of the vehicle 108, the speed of the vehicle 108, the direction of travel of the vehicle 108, and/or other data related to the specific trip of the vehicle 108. The vehicle profile module 502 may include a driver profile module 504. The driver profile module 504 is configured to collect, store and transmit driver profile data. For example, a driver profile may include a driver identification and information about whether the driver is a reserved or aggressive driver. The vehicle assistance server 102 is capable of tailoring the vehicle assistance data for the vehicle 108 according the driver profile data received from the in-vehicle computing systems 110.

The vehicle output module 506 is configured to implement the commands indicated by the vehicle assistance data. For example, the vehicle output module 506 may output information to one or more vehicle output devices 326 of the in-vehicle computing system 110. Such output devices 326 may include a display, speakers, or other vehicle systems that can receive vehicle control commands. Additionally or alternatively, the vehicle output module 506 may output control signals to one or more of the vehicle output devices 326 to control operation thereof.

The illustrative vehicle output module 506 includes a refuel prediction module 508, a cruise control module 510, a driver assistance module 512, and a notification module 514. Of course, the vehicle output module 506 may include additional or other sub-modules in other embodiments. The refuel prediction module 508 is configured to calculate a distance-to-empty prediction based on vehicle assistance data received from the vehicle assistance server 102. For example, the vehicle assistance data may include information about road conditions, including the grade of the upcoming road sections. Using the road grade data, the refuel prediction module 508 may calculate a distance-to-empty prediction that includes the upcoming road grade data, thereby making a more accurate distance-to-empty prediction. In some embodiments, the vehicle assistance server 102 calculates the distance-to-empty prediction and the refuel prediction module 508 only outputs the distance-to-empty prediction to the driver of the vehicle 108.

The cruise control module 510 is configured to receive vehicle assistance data that includes a vehicle control command about the cruise control of the vehicle. For example, the vehicle control command may include a command that the in-vehicle computing system 110 apply more power to the engine before the vehicle 108 reaches an upcoming uphill grade. In some embodiments, the vehicle output module 506 will only execute the vehicle control command regarding cruise control if the vehicle 108 is actively using cruise control.

The driver assistance module 512 is configured to output any other vehicle control commands that may be included in the vehicle assistance data received from the vehicle assistance server 102. For example, the driver assistance module 512 may be configured to output vehicle controls related to the advanced driver assistance system of the vehicle 108.

The notification module 514 is configured to output driver notifications to the driver of the vehicle 108 in response to receiving vehicle assistance data. In some embodiments, a notification is sent to a driver whenever vehicle assistance data is received by the in-vehicle computing system 110. In some embodiments, a notification is not output to the driver of the vehicle when the vehicle assistance data only includes a vehicle control command. Notifications may include suggestions of actions the driver should take when controlling the vehicle 108. Notifications may be output to the driver using one of the output devices 326. For example, a written message may output to the display 330 of the vehicle 108 indicating what information the vehicle assistance data contained. In some embodiments, the notifications include audible signals, such as a beep or a ding, to alert the driver that message is being output. In some embodiments, the notification is output to over the speakers 332 of the vehicle 108, such that the driver can hear the notification.

The sensor management module 516 is configured to manage the sensors that are integrated with the in-vehicle computing system 110. The sensor management module 516 records all of the data collected by sensors 338, which includes vehicle operational data, and transmits the vehicle operational data to the vehicle assistance server 102 through the communication module 518.

The communication module 518 is configured to allow the in-vehicle computing system 110 to communicate with the vehicle assistance server 102 over the network 104. The communication module 518 is configured to handle all of the different types of data that is handled by the in-vehicle computing system 110, and corresponds to the communication device 336. The communication module 518 may be configured to use any one or more communication technology (e.g., wired or wireless communications) and associated protocols (e.g., Ethernet, Bluetooth®, Wi-Fi®, WiMAX, etc.) to effect such communication.

Figure 6:
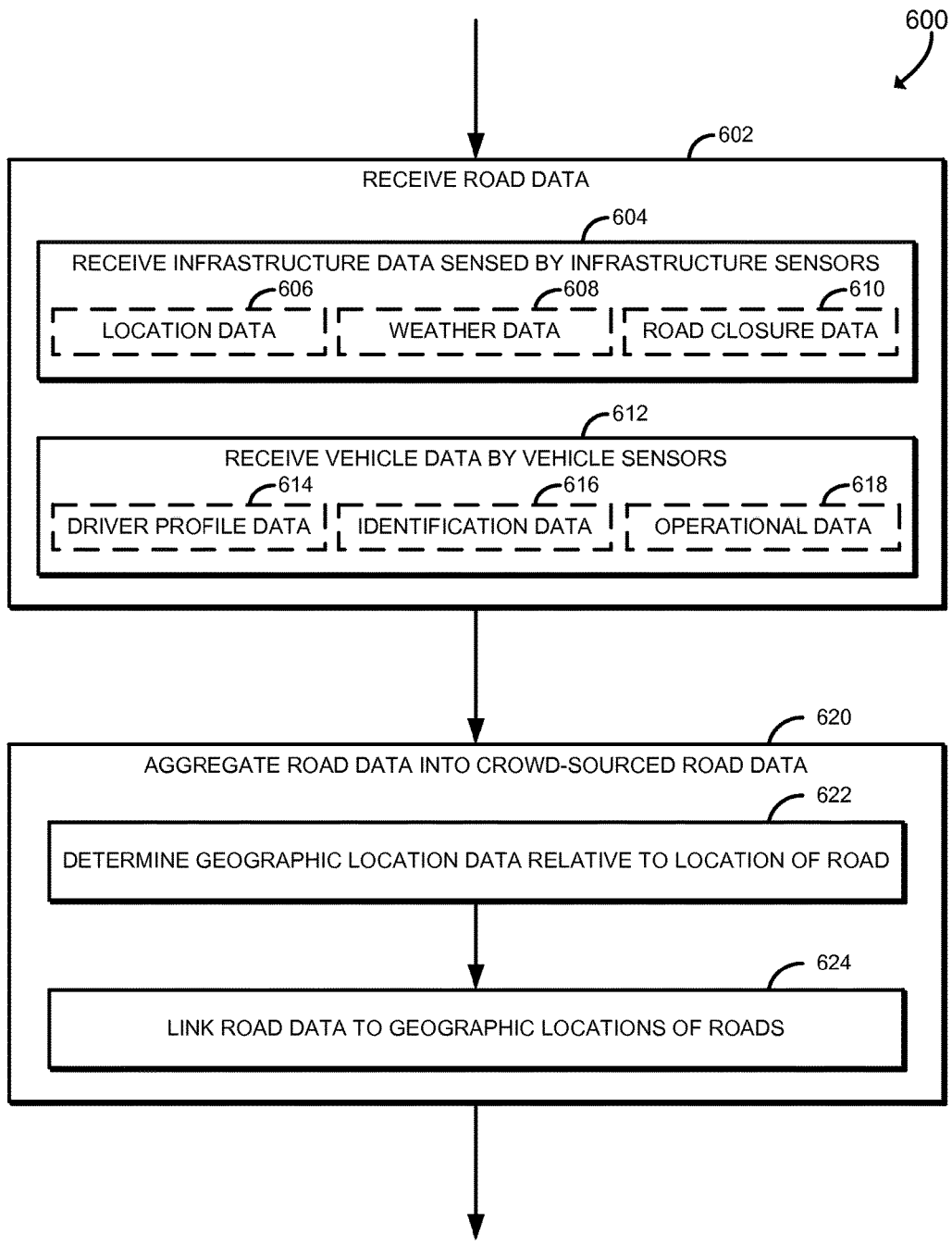
FIG. 6 is a simplified flow diagram of at least one embodiment of a method for generating crowd-sourced road data that may be executed by the vehicle assistance server of FIG. 2.

Referring to FIG. 6, in use, the vehicle assistance server 102 may execute a method 600 for generating crowd-source road data. At block 602, the vehicle assistance server 102 receives road data indicative of at least one characteristic of a road, or a road segment, traversed by each of the plurality of vehicles through a variety of sources. For example, at block 604, the vehicle assistance server 102 may receive infrastructure data sensed or generated by the infrastructure sensors 112 and/or other sensors 114. The infrastructure data may be embodied as any type of data indicative of a condition or characteristic of the roadway (e.g., a road segment). The particular types of infrastructure data sensed by the sensors 112, 114 may include, for example, location data 606, weather data 608, and/or road closure data 610. The location data 606 may be embodied as any type of data related to a particular location at which the sensors 112, 114 senses the data. The weather data 608 may be embodied as any information indicative of weather, weather patterns, and/or weather forecasts. For example, the weather data may include temperature data, precipitation data, wind speed data, barometric pressure data, or other data. The road closure data 610 may be embodied as any information related to road closures, such as, for example, vehicle collisions, closures for weather, delays due to traffic, landslides, etc. Of course, it should be appreciated that the vehicle assistance server 102 may receive other types of infrastructure data indication of a road condition or characteristic in other embodiments.

At block 612, the vehicle assistance server 102 may receive vehicle data sensed or generated by one or more vehicle sensors 338 associated with an in-vehicle computing system 110 of one or more vehicles 108 traversing the roadway system 106. The vehicle data may be embodied as any type of data indicative of a characteristic, condition, or quality of the vehicle 108 and/or user of the vehicle 108. The particular types of vehicle data may include, for example, driver profile data 614, vehicle identification data 616, and/or vehicle operational data 618. As discussed above, the driver profile data 614, the vehicle identification data 616, and the vehicle operational data 618 relate generally to information about the vehicle 108. Specifically, the driver profile data 614 may be embodied as any information known about the driver of the vehicle 108 (e.g., driver identification, driving restrictions, whether the driver's style of driving is aggressive or reserved, etc.); the vehicle identification data 616 may be embodied as information related to permanent characteristics of the vehicle 108 (e.g., the year, make, and model of the vehicle 108); and the vehicle operation data 618 may be embodied as information related to vehicle parameters of the specific trip of the vehicle 108 (e.g., the current location of the vehicle 108, the current weight of the vehicle 108, etc.).

At block 620, the vehicle assistance server 102 aggregates the received road into crowd-sourced road data. In some embodiments, the crowd-sourced road data is stored in a searchable database, such as vehicle assistance database 412. In some embodiments, the road data is indexed by the location of where the data was sensed by a sensor. For example, at block 622, the vehicle assistance server 102 determines geographic location data for each piece of collected road data. The geographic location data relates to the exact location where the data was sensed by the corresponding sensor (e.g., an infrastructure sensor 112, an other sensor 114, a sensor 338 of an in-vehicle computing system 110, etc.). The vehicle assistance server 102 also determines the road location data, which includes the geographic locations of roads. Of course, it should be appreciated that not all data may be sensed directly on the road, for example, an infrastructure sensor 112 may be set apart from the road. Consequently, the vehicle assistance server 102 may associate such data components of the crowd-sourced road data with nearby road locations. As such, at block 624, the vehicle assistance server 102 links the crowd-sourced road data to a road location using the geographic location data and the road location data. In some embodiments, the road data is also indexed using the time that the road data was sensed. For example, weather data indicating that there is snow on the road will eventually lose relevancy and accuracy as time passes.

Figure 7:
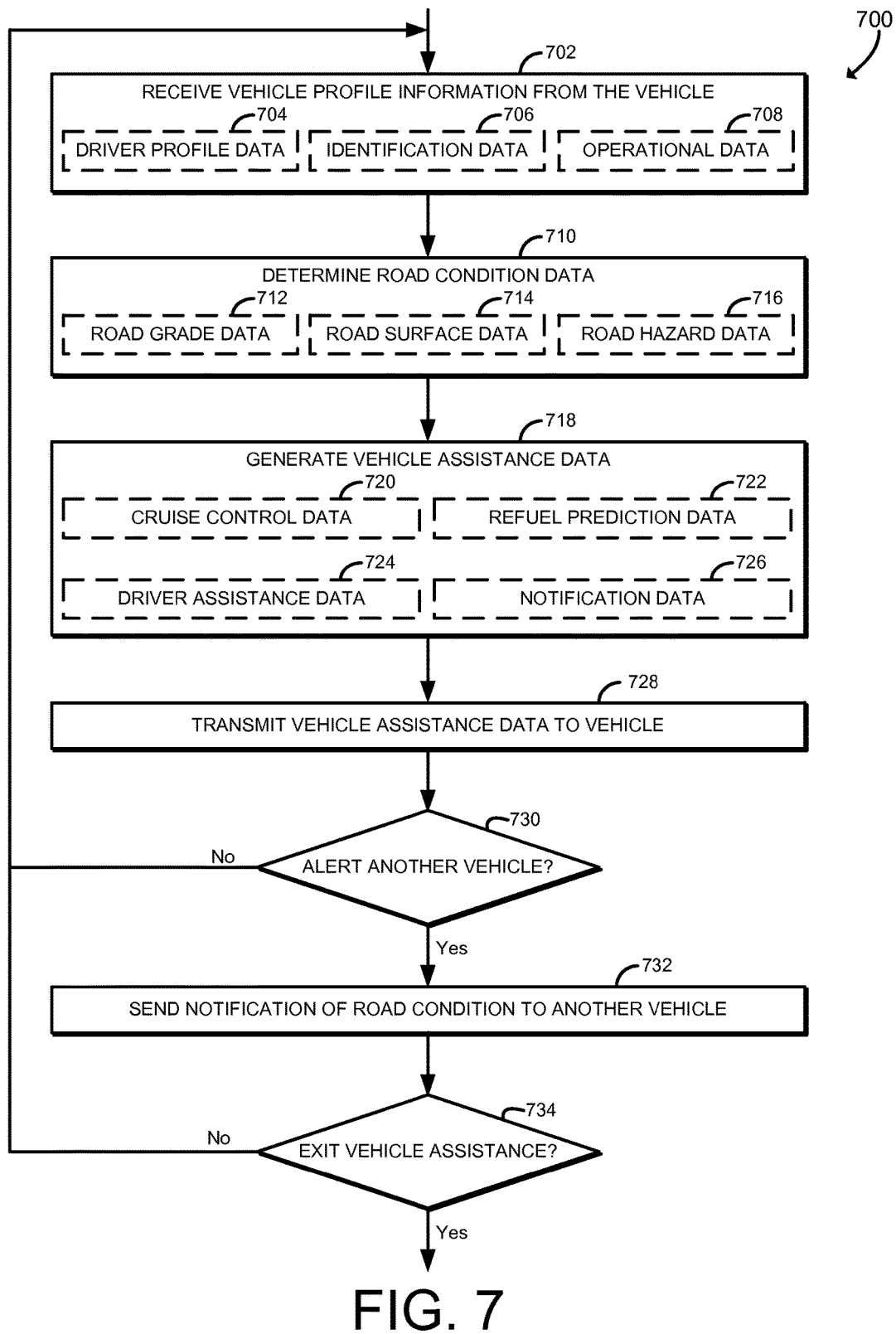
FIG. 7 is a simplified flow diagram of at least one embodiment of a method for generating vehicle assistance data that may be executed by the vehicle assistance server of FIG. 2.

Referring now to FIG. 7, in use, the vehicle assistance server 102 may execute a method 700 for determining vehicle assistance data for a particular vehicle. At block 702, the vehicle assistance server 102 receives vehicle data from the vehicle 108. In addition to providing information identifying characteristics of the vehicle 108 and/or vehicle operator, the vehicle profile information also provides an indication to the vehicle assistance server 102 that the in-vehicle computing system 110 of the vehicle 108 is ready to receive vehicle assistance data. In some embodiments, a vehicle 108 may contribute vehicle data to be used in determining road data without receiving any vehicle assistance data in return. In such an embodiment, the vehicle 108 is a passive data collector and not using vehicle assistance data to improve vehicle functions. As shown in FIG. 7, the vehicle data may include driver profile data 704, vehicle identification data 706, and/or vehicle operational data 708. As discussed above, the driver profile data 704 may be embodied as any type of data. As discussed above, the driver profile data 614, the vehicle identification data 616, and the vehicle operational data 618 relate generally to information about the vehicle 108. Specifically, the driver profile data 614 may be embodied as any information known about the driver of the vehicle 108 (e.g., driver identification, driving restrictions, whether the driver's style of driving is aggressive or reserved, etc.); the vehicle identification data 616 may be embodied as information related to permanent characteristics of the vehicle 108 (e.g., the year, make, and model of the vehicle 108); and the vehicle operation data 618 may be embodied as information related to vehicle parameters of the specific trip of the vehicle 108 (e.g., the current location of the vehicle 108, the current weight of the vehicle 108, etc.).

At block 710, the vehicle assistance server 102 determines road condition data based on the vehicle profile information and based on the crowd-sourced road data stored in the vehicle assistance database 412. Road condition data is any information indicative of one or more road conditions of a road or road segment. For example, the road condition data may include road grade data 712, road surface data 714, or road hazard data 716. The road grade data 712 may be embodied as any type of data indicative of the slope of the road over a given distance; or, in other words, the change in elevation of the road over a given distance of the road. The road grade data indicates the grade of the road at any given point. The road grade data 712 may be determined, for example, by comparing navigational maps, topographic maps, and received crowd-sourced data to determine the exact road grade. For example, the location sensors of in-vehicle computing systems 110 track the position of the corresponding vehicle 108 as it travels along a particular road. After enough vehicles have sent location data to the vehicle assistance server 102, the vehicle assistance server 102 can analyze that data to find what is likely to be the precise path of the road. Using that path data, the vehicle assistance server 102 may be capable of determining the elevation change of the road along a section of the road, and thereby determine road grade data 712.

The road surface data 714 may be embodied as any type of data indicative of the type of road surface present and/or other factors that might impact the quality of the road surface, such as snow or ice. The road surface data 714 may be determined by using navigation map information and crowd-sourced road data to determine what type of road surface is present, such as, for example, a concrete road, an asphalt road, or a dirt road. Additionally, the road surface data 714 may include information about factors that might impact the quality of the road surface. For example, the road surface data 714 may include weather data to determine that a road surface is slippery, whether due to ice or snow. In some embodiments, road surface data may be determined using road type data gathered from a digital navigation map. For example, many digital navigation maps include indicators about the size and paving of a particular road or road segment, such as whether a particular road is a dirt road. Oftentimes, information about the road surface can be inferred from the road type, for example, interstates are generally paved with concrete. The road surface data can be generated using data from a digital navigation map and crowd-sourced road data.

The road hazard data 716 may be embodied as any type of data indicative of whether any hazards exist on the road, and is determined by analyzing crowd-sourced road data. Hazards may include potholes, vehicle collisions, traffic congestion, or animals on the road, such as deer. For example, using the sensors 338 associated with the in-vehicle computing system 110, the vehicle assistance server 102 may be configured to determine whether a pothole is in the road from vehicles 108 indicating an object is hit, or vehicles 108 swerving to miss the obstruction. In another example, vehicle sensors indicating an object that is not another vehicle, and other evasive maneuvers executed by the driver of the vehicle 108, and indicated by the location sensors of the vehicle 108, may indicate that a deer is in or near the road.

At block 718, the vehicle assistance server 102 generates vehicle assistance data for the particular vehicle 108 based on the road condition data and the vehicle profile information. In some embodiments, the vehicle assistance server 102 first determines which tasks are to be included in the vehicle assistance data before generating the vehicle assistance data. Determining the tasks before generating the vehicle assistance data allows the vehicle assistance server 102 to deliver the vehicle assistance data to a particular vehicle 108 while conserving computing resources. In some embodiments, the vehicle assistance data may include cruise control data 720, refuel prediction data 722, driver assistance data 724, and/or notification data 726 as discussed above. The cruise control data 720 may include adjustments to the engine throttle based on road condition data. For example, if the road condition data indicates that an uphill road grade is approaching, the cruise control data 720 may include either a notification or a vehicle control command that the vehicle 108 should increase power to the engine to prepare for the impending road grade. In some embodiments, the cruise control data 720 is determined by the vehicle assistance server 102 only if the vehicle profile information indicates that the vehicle 108 is currently using cruise control. The refuel prediction data 722 may include a distance-to-empty prediction for the vehicle 108 based on the road condition data. For example, if the vehicle 108 is traveling down a section of road with many hills, the refuel prediction data 722 will use the road condition data and the vehicle's 108 past performance history (included in the vehicle profile information) to determine a distance-to-empty prediction that takes into account the impending uphill and downhill grades. In some embodiments, the refuel prediction data 722 is determined by the vehicle assistance server 102 only if the vehicle profile information indicates that the vehicle 108 actively outputs a distance-to-empty prediction to the driver. The driver assistance data 724 may include adjustments to any number of vehicle parameters controlled by an advanced driver assistance system. For example, an advanced driver vehicle assistance system can include a lane change assistant to assist the driver when changing lanes. In some embodiments, the driver assistance data 724 may include a vehicle control command to indicate to the driver that it is safe to change lanes based on the road condition data and the vehicle profile information of other vehicles 108. For example, when traveling down a two-lane road, visibility might be obstructed, so a driver may not know when it is safe to drive in the lane of on-coming traffic and pass a slower moving vehicle. The driver assistance data 724 may include a notification that informs a driver when it is safe to pass based on the location of other vehicles on the road, even if visibility of the driver is limited. Additionally, the vehicle assistance server 102 can send a notification to approaching vehicles 108 that another vehicle 108 is passing in their lane of traffic. The notification data 726 may indicate to the driver the contents of the vehicle assistance data received. The notification data 726 may include merely a recitation of vehicle parameters that the in-vehicle computing system 110 automatically adjusted, or the notification data 726 may include driving suggestions to the driver, such as, apply more throttle to the engine to prepare for an approaching uphill road grade or other information.

At block 728, the vehicle assistance server 102 transmits the vehicle assistance data to the in-vehicle computing system 110 of the vehicle 108. Upon receiving the vehicle assistance data, the in-vehicle computing system 110 is configured to implement the vehicle control commands or the notifications included in the vehicle assistance data. At block 730, the vehicle assistance server 102 determines whether the vehicle assistance data just generated for the vehicle may be useful for other vehicles 108 on the road. If the vehicle assistance data is determined to not be useful to other vehicles 108, the method 700 returns to the beginning and begins collecting data again. If the vehicle assistance data is determined to be useful, at block 732, the vehicle assistance server 102 sends a notification of the relevant road condition to another vehicle. For example, these types of notifications may include warnings that a faster vehicle is approaching from behind, or a warning that another vehicle is passing in your lane of traffic and to be mindful. At block 734, the vehicle assistance server 102 determines whether to exit the method 700.

Figure 8:
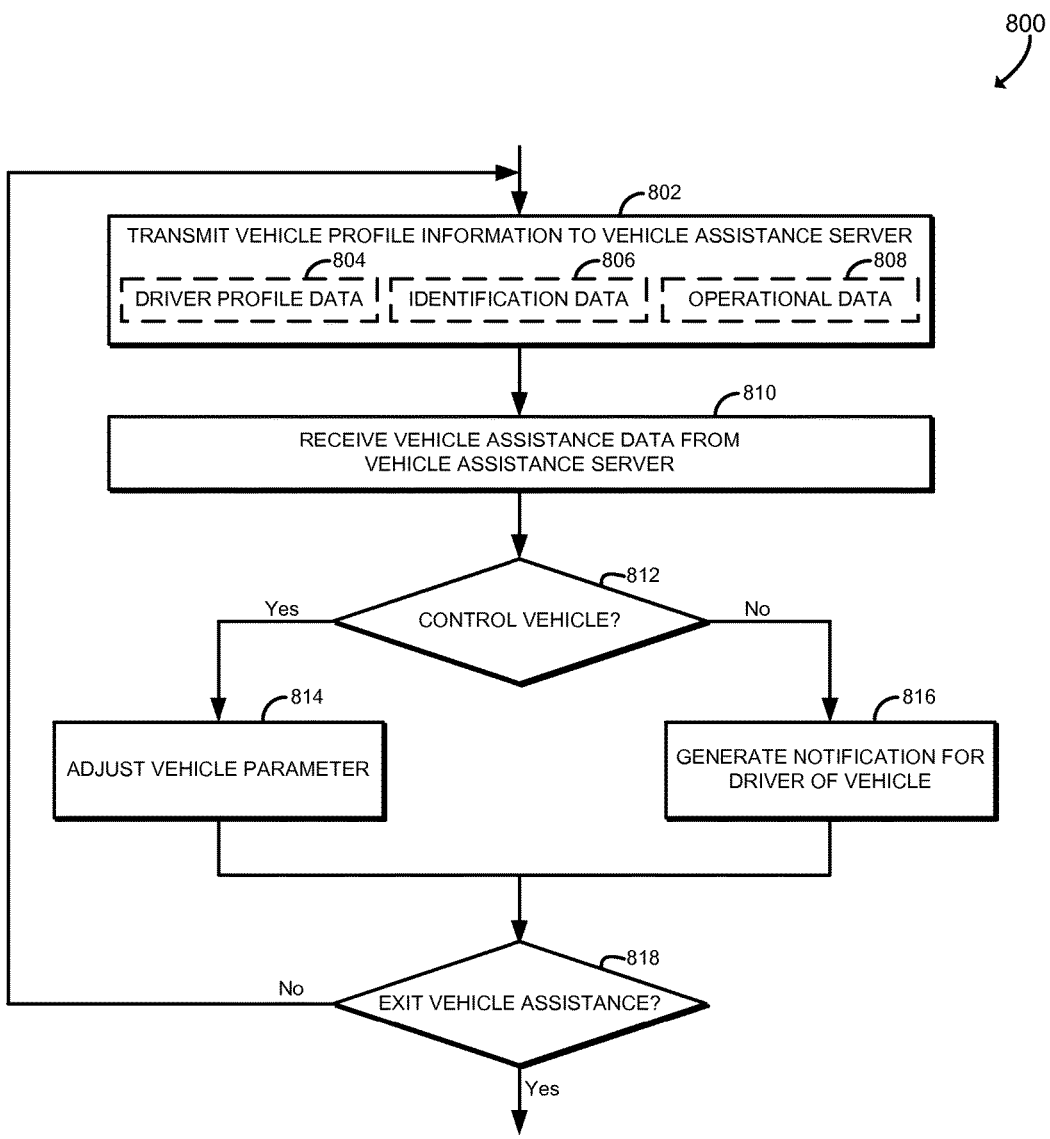
FIG. 8 is a simplified flow diagram of at least one embodiment of a method for assisting a driver of a vehicle that may be executed by the in-vehicle computing system of FIG. 3.

Referring to FIG. 8, in use, the in-vehicle computing system 110 may execute a method 800 for assisting a driver of a vehicle 108 based on the vehicle assistance data received from the vehicle assistance server 102. At block 802, the in-vehicle computing system 110 transmits vehicle profile information to the vehicle assistance server 102. In some embodiments, the in-vehicle computing system 110 senses data using the sensors 338 before transmitting the vehicle profile information. In some embodiments, the vehicle profile information may include driver profile data 804, vehicle identification data 806, or vehicle operational data 808 as discussed above.

At block 810, the in-vehicle computing system 110 receives vehicle assistance data from the vehicle assistance server 102. As discussed above, the vehicle assistance data is generated by the vehicle assistance server 102 based on the crowd-sourced road data and the vehicle profile information received from the in-vehicle computing system 110. At block 812, the in-vehicle computing system 110 determines whether the vehicle assistance data includes a vehicle control command. If the in-vehicle computing system 110 determines that a vehicle control command is present, the in-vehicle computing system 110, at block 814, adjusts the vehicle parameter indicated by the vehicle control command. A vehicle parameter that is adjustable by the in-vehicle computing system 110 may include the throttle of the engine or one or more indicator lights. If the in-vehicle computing system 110 determines that no vehicle control command is present, at block 816, the in-vehicle computing system generates a notification based on the vehicle assistance data to output to the driver of the vehicle 108. The notification may include road data included in the vehicle assistance data or suggestions to the driver about vehicle parameters that should be adjusted by the driver. In some embodiments, the in-vehicle computing system 110 generates a notification based on the vehicle assistance data when a vehicle control command is present in the vehicle assistance data.

Examples

Illustrative examples of the technologies disclosed herein are provided below. An embodiment of the technologies may include any one or more, and any combination of, the examples described below.

Example 1 includes a vehicle assistance server for assisting a driver of a vehicle, the vehicle assistance server comprising a data acquisition module to receive road data from each of a plurality of vehicles, wherein the road data includes data indicative of at least one characteristic of a first road segment traversed by each of the plurality of vehicles; a data aggregation module to aggregate the road data received from each of the plurality of vehicles to generate crowd-sourced road data associated with the first road segment; a vehicle information module to receive vehicle profile information from a first vehicle located on the first road segment, wherein the vehicle profile information defines at least one characteristic of the first vehicle; and a vehicle assistance data determination module to determine vehicle assistance data for the first vehicle based on the vehicle profile information and the crowd-sourced road data associated with the first road segment, wherein the vehicle assistance data is usable by an in-vehicle computing device of the first vehicle to facilitate traversal of the first road segment by the vehicle.

Example 2 includes the subject matter of Example 1, and wherein the vehicle assistance data determination module is to determine road grade data of the first road segment based on the crowd-sourced road data, wherein the road grade data is indicative of a vertical change in elevation along the first road segment.

Example 3 includes the subject matter of any of Examples 1 and 2, and wherein the vehicle assistance data determination module is to determine refueling prediction data based on the road grade data and the vehicle profile information, wherein the refueling prediction data estimates a distance the first vehicle can travel before a refueling is required.

Example 4 includes the subject matter of any of Examples 1-3, and wherein the refueling prediction data includes an estimated travelling distance until a refueling is required by the first vehicle based on the grade of the first road segment.

Example 5 includes the subject matter of any of Examples 1-4, and wherein the refueling prediction data is usable by the in-vehicle computing device of the first vehicle to adjust the estimated distance till refueling according to a past fuel performance of the first vehicle on the first road segment.

Example 6 includes the subject matter of any of Examples 1-5, and wherein the vehicle assistance data determination module is to determine cruise control data based on the road grade data and the vehicle profile information, wherein the cruise control data is usable by the in-vehicle computing device to adjust a throttle of an engine of the first vehicle.

Example 7 includes the subject matter of any of Examples 1-6, and wherein the cruise control data is usable by the in-vehicle computing device to adjust the throttle of the engine before the first vehicle begins to traverse the first road segment.

Example 8 includes the subject matter of any of Examples 1-7, and wherein the cruise control data is based on the road grade data and information included in the vehicle profile information indicative of an operational characteristic of a second vehicle while traversing the first road segment, wherein the second vehicle has at least one permanent characteristic in common with the first vehicle.

Example 9 includes the subject matter of any of Examples 1-8, and wherein the vehicle assistance data determination module is to determine refueling prediction data based on the crowd-sourced road data and the vehicle profile information, wherein the vehicle profile information includes driver profile data that identifies a driver of the first vehicle from a plurality of potential drivers and includes an indicator of a driving style of the identified driver, and wherein the refueling prediction data estimates a distance the first vehicle can travel before a refueling is required.

Example 10 includes the subject matter of any of Examples 1-9, and wherein the data acquisition module includes an infrastructure data module to receive infrastructure road data from each of a plurality of infrastructure sensors associated with the first road segment, wherein the infrastructure road data includes data indicative of at least one characteristic of the first road segment traversed by each of the plurality of vehicles.

Example 11 includes the subject matter of any of Examples 1-10, and wherein the vehicle information module receives vehicle identification data indicative of one or more permanent characteristics of the vehicle and vehicle operational data indicative of trip-specific characteristics of the vehicle.

Example 12 includes the subject matter of any of Examples 1-11, and wherein the vehicle assistance data determination module is to determine road surface data indicative of characteristics of a surface of the first road segment.

Example 13 includes the subject matter of any of Examples 1-12, and wherein the vehicle assistance data determination module is to determine road type data indicative of a type of road of the first road segment from a digital navigational map.

Example 14 includes the subject matter of any of Examples 1-13, and wherein the vehicle assistance data determination module is to receive weather data from one or more infrastructure sensors associated with the first road segment, wherein determining the road surface data comprises determining, by the vehicle assistance server, road surface data based on the road type data and the weather data.

Example 15 includes the subject matter of any of Examples 1-14, and wherein the vehicle assistance data determination module is to determine road hazard data based on the crowd-sourced road data indicative of one or more hazardous conditions of the first road segment.

Example 16 includes the subject matter of any of Examples 1-15, and wherein the vehicle assistance data determination module is to receive vehicle operational data from each of the plurality of vehicles traversing the first road segment, and determine a location of one or more potholes located in the first road segment based on the crowd-sourced road data and the vehicle operational data.

Example 17 includes the subject matter of any of Examples 1-16, and wherein the vehicle assistance data determination module is to determine one or more vehicle control commands usable by the in-vehicle computing device to adjust one or more vehicle parameters of the first vehicle.

Example 18 includes the subject matter of any of Examples 1-17, and wherein the vehicle assistance data determination module is to determine one or more notifications for a driver of the first vehicle to be delivered by an output device of the first vehicle.

Example 19 includes the subject matter of any of Examples 1-18, and further including a communication module to send one or more notifications to one or more second vehicles traveling on the first road segment, wherein the one or more notifications are to alert the one or more second vehicles of a road condition of the first road segment.

Example 20 includes the subject matter of any of Examples 1-19, and wherein the data aggregation module is to generate a probabilistic model based on the crowd-sourced road data; and the vehicle assistance data determination module is to determine the vehicle assistance data based on the vehicle profile information and the probabilistic model.

Example 21 includes the subject matter of any of Examples 1-20, and wherein the data acquisition module is to apply a weighting factor to the road data received from each of the plurality of vehicles based on a date that the road data is collected by each of the plurality of vehicles.

Example 22 includes an in-vehicle computing system for assisting a driver of a first vehicle, the in-vehicle computing system comprising a vehicle profile module to transmit vehicle profile information of the first vehicle indicative of at least one characteristic of the first vehicle to a vehicle assistance server while the first vehicle is located on a first road segment; a vehicle output module to (i) receive vehicle assistance data from the vehicle assistance server, wherein the vehicle assistance data is generated based on the vehicle profile information and crowd-sourced road data associated with the first road segment, (ii) determine the vehicle output module to determine at least one vehicle control command based on the received vehicle assistance data, and (iii) adjust a vehicle parameter of the first vehicle based on the vehicle control command.

Example 23 includes the subject matter of Example 22, and further including a notification module to generate, in response to receiving the vehicle assistance data, a notification for a driver of the first vehicle that includes information related to the vehicle assistance data.

Example 24 includes the subject matter of any of Examples 22 and 23, and wherein the vehicle profile computing system is to sense vehicle operational data indicative of an operation of the first vehicle while the first vehicle traverses the first road segment, and transmit the vehicle operational data and vehicle identification data indicative of at least one permanent characteristic of the first vehicle.

Example 25 includes the subject matter of any of Examples 22-24, and wherein the vehicle output module is to receive cruise control data, and adjust the vehicle parameter comprises adjusting, by the in-vehicle computing system, a throttle of an engine of the first vehicle based on the cruise control data.

Example 26 includes the subject matter of any of Examples 22-25, and wherein the vehicle output module is to receive refueling prediction data that estimates a distance the first vehicle can travel before a refueling is required, and adjust a throttle of an engine of the first vehicle based on the cruise control data.

Example 27 includes the subject matter of any of Examples 22-26, and wherein the vehicle output module is to receive road condition data, from the vehicle assistance server, indicative of one or more road conditions of the first road segment; and generate a notification to inform a driver of the first vehicle about the one or more road conditions.

Example 28 includes the subject matter of any of Examples 22-27, and wherein the vehicle output module is to receive road grade data indicative of a vertical change in elevation along the first road segment from the vehicle assistance server.

Example 29 includes a method for assisting a driver of a vehicle, the method comprising receiving, by a vehicle assistance server, road data from each of a plurality of vehicles, wherein the road data includes data indicative of at least one characteristic of a first road segment traversed by each of the plurality of vehicles; aggregating, by the vehicle assistance server, the road data received from each of the plurality of vehicles to generate crowd-sourced road data associated with the first road segment; receiving, by the vehicle assistance server, vehicle profile information from a first vehicle located on the first road segment, wherein the vehicle profile information defines at least one characteristic of the first vehicle; determining, by the vehicle assistance server, vehicle assistance data for the first vehicle based on the vehicle profile information and the crowd-sourced road data associated with the first road segment, wherein the vehicle assistance data is usable by an in-vehicle computing device of the first vehicle to facilitate traversal of the first road segment by the vehicle; and transmitting the vehicle assistance data to the first vehicle.

Example 30 includes the subject matter of Example 29, and further including determining, by the vehicle assistance server and based on the crowd-sourced road data, road grade data of the first road segment indicative of a vertical change in elevation along the first road segment.

Example 31 includes the subject matter of any of Examples 29 and 30, and wherein determining vehicle assistance data comprises determining, by the vehicle assistance server, refueling prediction data based on the road grade data and the vehicle profile information, wherein the refueling prediction data estimates a distance the first vehicle can travel before a refueling is required.

Example 32 includes the subject matter of any of Examples 29-31, and wherein determining the refueling prediction data comprises determining, by the vehicle assistance server, refueling prediction data based on the road grade data and the vehicle profile information, wherein the refueling prediction data includes an estimated travelling distance until a refueling is required by the first vehicle based on a determined grade of the first road segment.

Example 33 includes the subject matter of any of Examples 29-32, and wherein the refueling prediction data is usable by the in-vehicle computing device of the first vehicle to adjust the estimated distance till refueling according to a past fuel performance of the first vehicle on the first road segment.

Example 34 includes the subject matter of any of Examples 29-33, and wherein determining vehicle assistance data comprises determining, by the vehicle assistance server, cruise control data based on the road grade data and the vehicle profile information, wherein the cruise control data is usable by the in-vehicle computing device to adjust a throttle of an engine of the first vehicle.

Example 35 includes the subject matter of any of Examples 29-34, and wherein determining the cruise control data comprises determining cruise control data usable by the in-vehicle computing device to adjust the throttle of the engine before the first vehicle begins to traverse the first road segment.

Example 36 includes the subject matter of any of Examples 29-35, and wherein determining the cruise control data comprises determining, by the vehicle assistance server, cruise control data based on the road grade data and information included in the vehicle profile information indicative of an operational characteristic of a second vehicle while traversing the first road segment, wherein the second vehicle has at least one permanent characteristic in common with the first vehicle.

Example 37 includes the subject matter of any of Examples 29-36, and further including determining, by the vehicle assistance server and based on the crowd-sourced road data and the vehicle profile information, refueling predication data that estimates a distance the first vehicle can travel before a refueling is required, wherein the vehicle profile information includes driver profile data that identifies a driver of the first vehicle from a plurality of potential drivers and includes an indicator of a driving style of the identified driver.

Example 38 includes the subject matter of any of Examples 29-37, and further including receiving, by the vehicle assistance server, infrastructure road data from each of a plurality of infrastructure sensors associated with the first road segment, wherein the infrastructure road data includes data indicative of at least one characteristic of the first road segment traversed by each of the plurality of vehicles.

Example 39 includes the subject matter of any of Examples 29-38, and wherein receiving vehicle profile information comprises receiving, by the vehicle assistance server, vehicle identification data indicative of one or more permanent characteristics of the vehicle and vehicle operational data indicative of trip-specific characteristics of the vehicle.

Example 40 includes the subject matter of any of Examples 29-39, and wherein determining vehicle assistance data comprises determining, by the vehicle assistance server, road surface data indicative of characteristics of a surface of the first road segment.

Example 41 includes the subject matter of any of Examples 29-40, and wherein determining the road surface data comprises determining, by the vehicle assistance server, road type data indicative of a type of road of the first road segment from a digital navigational map.

Example 42 includes the subject matter of any of Examples 29-41, and further including receiving, by the vehicle assistance server, weather data from one or more infrastructure sensors associated with the first road segment, wherein determining the road surface data comprises determining, by the vehicle assistance server, road surface data based on the road type data and the weather data.

Example 43 includes the subject matter of any of Examples 29-42, and further including determining, by the vehicle assistance server, road hazard data based on the crowd-sourced road data indicative of one or more hazardous conditions of the first road segment.

Example 44 includes the subject matter of any of Examples 29-43, and wherein receiving the road data comprising receiving, by the vehicle assistance server, vehicle operational data from each of the plurality of vehicles traversing the first road segment, and determining the road hazard data comprises determining a location of one or more potholes located in the first road segment based on the crowd-sourced road data and the vehicle operational data.

Example 45 includes the subject matter of any of Examples 29-44, and wherein determining vehicle assistance data comprises determining, by the vehicle assistance server, one or more vehicle control commands usable by the in-vehicle computing device to adjust one or more vehicle parameters of the first vehicle.

Example 46 includes the subject matter of any of Examples 29-45, and wherein determining vehicle assistance data comprises determining, by the vehicle assistance server, one or more notifications for a driver of the first vehicle to be delivered by an output device of the first vehicle.

Example 47 includes the subject matter of any of Examples 29-46, and further including sending, by the vehicle assistance server, one or more notifications to one or more second vehicles traveling on the first road segment, wherein the one or more notifications are to alert the one or more second vehicles of a road condition of the first road segment.

Example 48 includes the subject matter of any of Examples 29-47, and further including generating a probabilistic model based on the crowd-sourced road data, and wherein determining the vehicle assistance data comprises determining vehicle assistance data based on the vehicle profile information and the probabilistic model.

Example 49 includes the subject matter of any of Examples 29-48, and further including applying, by the vehicle assistance server, a weighting factor to the road data received from each of the plurality of vehicles based on a date that the road data is collected by each of the plurality of vehicles.

Example 50 includes a method for assisting a driver of a vehicle, the method comprising transmitting, by an in-vehicle computing system of a first vehicle, vehicle profile information indicative of at least one characteristic of the first vehicle to a vehicle assistance server while the first vehicle is located on a first road segment; receiving, by the in-vehicle computing system, vehicle assistance data from the vehicle assistance server, wherein the vehicle assistance data is generated based on the vehicle profile information and crowd-sourced road data associated with the first road segment; determining, by the in-vehicle computing system, at least one vehicle control command based on the received vehicle assistance data; and adjusting, by the in-vehicle computing system, a vehicle parameter of the first vehicle based on the vehicle control command.

Example 51 includes the subject matter of Example 50, and further including generating, by the in-vehicle computing system and in response to receiving the vehicle assistance data, a notification for a driver of the first vehicle that includes information related to the vehicle assistance data.

Example 52 includes the subject matter of any of Examples 50 and 51, and wherein transmitting vehicle profile information comprises sensing, by the in-vehicle computing system, vehicle operational data indicative of an operation of the first vehicle while the first vehicle traverses the first road segment; and transmitting, by the in-vehicle computing system, the vehicle operational data and vehicle identification data indicative of at least one permanent characteristic of the first vehicle.

Example 53 includes the subject matter of any of Examples 50-52, and wherein receiving vehicle assistance data comprises receiving, by the in-vehicle computing system, cruise control data, and adjusting the vehicle parameter comprises adjusting, by the in-vehicle computing system, a throttle of an engine of the first vehicle based on the cruise control data.

Example 54 includes the subject matter of any of Examples 50-53, and wherein receiving vehicle assistance data comprises receiving, by the in-vehicle computing system and from the vehicle assistance server, refueling prediction data that estimates a distance the first vehicle can travel before a refueling is required, and further comprising adjusting, by the in-vehicle computing system, a refueling estimate for the first vehicle based on the refueling prediction data.

Example 55 includes the subject matter of any of Examples 50-54, and wherein receiving vehicle assistance data comprises receiving, by the in-vehicle computing system and from the vehicle assistance server, road condition data indicative of one or more road conditions of the first road segment, and further comprising generating, by the in-vehicle computing system, a notification to inform a driver of the first vehicle about the one or more road conditions.

Example 56 includes the subject matter of any of Examples 50-55, and wherein receiving road condition data comprises receiving, by the in-vehicle computing system and from the vehicle assistance server, road grade data indicative of a vertical change in elevation along the first road segment.

Example 57 includes one or more machine readable storage media comprising a plurality of instructions stored thereon that in response to being executed result in a computing device performing the method of any of Examples 29-56.

Example 58 includes a vehicle assistance server for assisting a driver of a vehicle. The vehicle assistance server includes means for receiving road data from each of a plurality of vehicles, wherein the road data includes data indicative of at least one characteristic of a first road segment traversed by each of the plurality of vehicles; means for aggregating the road data received from each of the plurality of vehicles to generate crowd-sourced road data associated with the first road segment; means for receiving vehicle profile information from a first vehicle located on the first road segment, wherein the vehicle profile information defines at least one characteristic of the first vehicle; means for determining vehicle assistance data for the first vehicle based on the vehicle profile information and the crowd-sourced road data associated with the first road segment, wherein the vehicle assistance data is usable by an in-vehicle computing device of the first vehicle to facilitate traversal of the first road segment by the vehicle; and means for transmitting the vehicle assistance data to the first vehicle.

Example 59 includes the subject matter of Example 58, and further including means for determining, based on the crowd-sourced road data, road grade data of the first road segment indicative of a vertical change in elevation along the first road segment.

Example 60 includes the subject matter of Example 58 or 59, and wherein the means for determining vehicle assistance data comprises means for determining refueling prediction data based on the road grade data and the vehicle profile information, wherein the refueling prediction data estimates a distance the first vehicle can travel before a refueling is required.

Example 61 includes the subject matter of any of Examples 58-60, and wherein the means for determining the refueling prediction data comprises means for determining refueling prediction data based on the road grade data and the vehicle profile information, wherein the refueling prediction data includes an estimated travelling distance until a refueling is required by the first vehicle based on a determined grade of the first road segment.

Example 62 includes the subject matter of any of Examples 58-61, and wherein the refueling prediction data is usable by the in-vehicle computing device of the first vehicle to adjust the estimated distance till refueling according to a past fuel performance of the first vehicle on the first road segment.

Example 63 includes the subject matter of any of Examples 58-62, and wherein the means for determining vehicle assistance data comprises means for determining cruise control data based on the road grade data and the vehicle profile information, wherein the cruise control data is usable by the in-vehicle computing device to adjust a throttle of an engine of the first vehicle.

Example 64 includes the subject matter of any of Examples 58-63, and wherein the means for determining the cruise control data comprises means for determining cruise control data usable by the in-vehicle computing device to adjust the throttle of the engine before the first vehicle begins to traverse the first road segment.

Example 65 includes the subject matter of any of Examples 58-64, and wherein the means for determining the cruise control data comprises means for determining cruise control data based on the road grade data and information included in the vehicle profile information indicative of an operational characteristic of a second vehicle while traversing the first road segment, wherein the second vehicle has at least one permanent characteristic in common with the first vehicle.

Example 66 includes the subject matter of any of Examples 58-65, and further includes means for determining, based on the crowd-sourced road data and the vehicle profile information, refueling predication data that estimates a distance the first vehicle can travel before a refueling is required, wherein the vehicle profile information includes driver profile data that identifies a driver of the first vehicle from a plurality of potential drivers and includes an indicator of a driving style of the identified driver.

Example 67 includes the subject matter of any of Examples 58-66, and further includes means for receiving infrastructure road data from each of a plurality of infrastructure sensors associated with the first road segment, wherein the infrastructure road data includes data indicative of at least one characteristic of the first road segment traversed by each of the plurality of vehicles.

Example 68 includes the subject matter of any of Examples 58-67, and wherein the means for receiving vehicle profile information comprises means for receiving vehicle identification data indicative of one or more permanent characteristics of the vehicle and vehicle operational data indicative of trip-specific characteristics of the vehicle.

Example 69 includes the subject matter of any of Examples 58-68, and wherein the means for determining vehicle assistance data comprises means for determining road surface data indicative of characteristics of a surface of the first road segment.

Example 70 includes the subject matter of any of Examples 58-69, and wherein the means for determining the road surface data comprises means for determining road type data indicative of a type of road of the first road segment from a digital navigational map.

Example 71 includes the subject matter of any of Examples 58-70, and further includes means for receiving weather data from one or more infrastructure sensors associated with the first road segment, wherein the means for determining the road surface data comprises means for determining road surface data based on the road type data and the weather data.

Example 72 includes the subject matter of any of Examples 58-71, and further includes means for determining road hazard data based on the crowd-sourced road data indicative of one or more hazardous conditions of the first road segment.

Example 73 includes the subject matter of any of Examples 58-72, and wherein the means for receiving the road data comprising means for receiving vehicle operational data from each of the plurality of vehicles traversing the first road segment, and the means for determining the road hazard data comprises means for determining a location of one or more potholes located in the first road segment based on the crowd-sourced road data and the vehicle operational data.

Example 74 includes the subject matter of any of Examples 58-73, and wherein the means for determining vehicle assistance data comprises means for determining one or more vehicle control commands usable by the in-vehicle computing device to adjust one or more vehicle parameters of the first vehicle.

Example 75 includes the subject matter of any of Examples 58-74, and wherein the means for determining vehicle assistance data comprises means for determining one or more notifications for a driver of the first vehicle to be delivered by an output device of the first vehicle.

Example 76 includes the subject matter of any of Examples 58-75, and further includes means for sending one or more notifications to one or more second vehicles traveling on the first road segment, wherein the one or more notifications are to alert the one or more second vehicles of a road condition of the first road segment.

Example 77 includes the subject matter of any of Examples 58-76, and further includes means for generating a probabilistic model based on the crowd-sourced road data, and wherein the means for determining the vehicle assistance data comprises means for determining vehicle assistance data based on the vehicle profile information and the probabilistic model.

Example 78 includes the subject matter of any of Examples 58-77, and further includes means for applying a weighting factor to the road data received from each of the plurality of vehicles based on a date that the road data is collected by each of the plurality of vehicles.

Example 79 includes in-vehicle computing system for assisting a driver of a first vehicle. The in-vehicle computing system includes means for transmitting vehicle profile information indicative of at least one characteristic of the first vehicle to a vehicle assistance server while the first vehicle is located on a first road segment; means for receiving vehicle assistance data from the vehicle assistance server, wherein the vehicle assistance data is generated based on the vehicle profile information and crowd-sourced road data associated with the first road segment; means for determining at least one vehicle control command based on the received vehicle assistance data; and means for adjusting a vehicle parameter of the first vehicle based on the vehicle control command.

Example 80 includes the subject matter of Example 79, and further includes means for generating, in response to receiving the vehicle assistance data, a notification for a driver of the first vehicle that includes information related to the vehicle assistance data.

Example 81 includes the subject matter of Example 79 or 80, and wherein the means for transmitting vehicle profile information comprises means for sensing vehicle operational data indicative of an operation of the first vehicle while the first vehicle traverses the first road segment; and means for transmitting the vehicle operational data and vehicle identification data indicative of at least one permanent characteristic of the first vehicle.

Example 82 includes the subject matter of any of Examples 79-81, and wherein the means for receiving vehicle assistance data comprises means for receiving cruise control data, and the means for adjusting the vehicle parameter comprises means for adjusting a throttle of an engine of the first vehicle based on the cruise control data.

Example 83 includes the subject matter of any of Examples 79-82, and wherein the means for receiving vehicle assistance data comprises means for receiving, from the vehicle assistance server, refueling prediction data that estimates a distance the first vehicle can travel before a refueling is required, and further includes means for adjusting a refueling estimate for the first vehicle based on the refueling prediction data.

Example 84 includes the subject matter of any of Examples 79-83, and wherein the means for receiving vehicle assistance data comprises means for receiving, from the vehicle assistance server, road condition data indicative of one or more road conditions of the first road segment, and further includes means for generating a notification to inform a driver of the first vehicle about the one or more road conditions.

Example 85 includes the subject matter of any of Examples 79-84, and wherein the means for receiving road condition data comprises means for receiving, from the vehicle assistance server, road grade data indicative of a vertical change in elevation along the first road segment.

The invention claimed is:

1. One or more machine readable storage media comprising a plurality of instructions stored thereon that, when executed, cause an in-vehicle computing system of a first vehicle to:
   transmit vehicle profile information indicative of at least one characteristic of the first vehicle to a vehicle assistance server while the first vehicle is located on a first road segment;
   receive vehicle assistance data from the vehicle assistance server, wherein the vehicle assistance data is generated based on the vehicle profile information and crowd-sourced road data associated with the first road segment;
   determine at least one vehicle control command based on the received vehicle assistance data; and
   adjust a vehicle parameter of the first vehicle based on the vehicle control command.

2. The one or more machine readable storage media of claim 1, wherein the plurality of instructions, when executed, further cause the in-vehicle computing system to generate, in response to receipt of the vehicle assistance data, a notification for a driver of the first vehicle that includes information related to the vehicle assistance data.

3. The one or more machine readable storage media of claim 1, wherein to transmit vehicle profile information comprises to:
   sense vehicle operational data indicative of an operation of the first vehicle while the first vehicle traverses the first road segment; and
   transmit the vehicle operational data and vehicle identification data indicative of at least one permanent characteristic of the first vehicle.

4. The one or more machine readable storage media of claim 1, wherein to:
   receive vehicle assistance data comprises to receive cruise control data, and
   adjust the vehicle parameter comprises to adjust a throttle of an engine of the first vehicle based on the cruise control data.

5. The one or more machine readable storage media of claim 1, wherein to receive vehicle assistance data comprises to:
   receive, from the vehicle assistance server, refueling prediction data that estimates a distance the first vehicle can travel before a refueling is required, and
   wherein the plurality of instructions, when executed, further cause the in-vehicle computing system to adjust a refueling estimate for the first vehicle based on the refueling prediction data.

6. The one or more machine readable storage media of claim 1, wherein to receive vehicle assistance data comprises to receive, from the vehicle assistance server, road condition data indicative of one or more road conditions of the first road segment, and
   wherein the plurality of instructions, when executed, further cause the in-vehicle computing system to generate a notification to inform a driver of the first vehicle about the one or more road conditions.

7. The one or more machine readable storage media of claim 6, wherein to receive road condition data comprises to receive, from the vehicle assistance server, road grade data indicative of a vertical change in elevation along the first road segment.

8. A method for assisting a driver of a vehicle, the method comprising:
   transmitting, by an in-vehicle computing system of a first vehicle, vehicle profile information indicative of at least one characteristic of the first vehicle to a vehicle assistance server while the first vehicle is located on a first road segment;
   receiving, by the in-vehicle computing system, vehicle assistance data from the vehicle assistance server, wherein the vehicle assistance data is generated based on the vehicle profile information and crowd-sourced road data associated with the first road segment;
   determining, by the in-vehicle computing system, at least one vehicle control command based on the received vehicle assistance data; and
   adjusting, by the in-vehicle computing system, a vehicle parameter of the first vehicle based on the vehicle control command.

9. The method of claim 8, further comprising generating, by the in-vehicle computing system and in response to receiving the vehicle assistance data, a notification for a driver of the first vehicle that includes information related to the vehicle assistance data.

10. The method of claim 8, wherein transmitting vehicle profile information comprises:
    sensing, by the in-vehicle computing system, vehicle operational data indicative of an operation of the first vehicle while the first vehicle traverses the first road segment; and
    transmitting, by the in-vehicle computing system, the vehicle operational data and vehicle identification data indicative of at least one permanent characteristic of the first vehicle.

11. The method of claim 8, wherein:
    receiving vehicle assistance data comprises receiving, by the in-vehicle computing system, cruise control data, and
    adjusting the vehicle parameter comprises adjusting, by the in-vehicle computing system, a throttle of an engine of the first vehicle based on the cruise control data.

12. The method of claim 8, wherein receiving vehicle assistance data comprises:
    receiving, by the in-vehicle computing system and from the vehicle assistance server, refueling prediction data that estimates a distance the first vehicle can travel before a refueling is required, and
    further comprising adjusting, by the in-vehicle computing system, a refueling estimate for the first vehicle based on the refueling prediction data.

13. The method of claim 8, wherein receiving vehicle assistance data comprises receiving, by the in-vehicle computing system and from the vehicle assistance server, road condition data indicative of one or more road conditions of the first road segment, and
further comprising generating, by the in-vehicle computing system, a notification to inform a driver of the first vehicle about the one or more road conditions.

14. The method of claim 13, wherein receiving road condition data comprises receiving, by the in-vehicle computing system and from the vehicle assistance server, road grade data indicative of a vertical change in elevation along the first road segment.

15. An in-vehicle computing system for assisting a driver of a first vehicle, the in-vehicle computing system comprising:
a vehicle profile module to (i) sense vehicle operational data indicative of an operation of the first vehicle while the first vehicle traverses a first road segment, (ii) acquire vehicle identification data indicative of at least one permanent characteristic of the first vehicle, and (ii) transmit the vehicle operational data and the vehicle identification data to a vehicle assistance server while the first vehicle is located on the first road segment;
a vehicle output module to (i) receive vehicle assistance data from the vehicle assistance server, wherein the vehicle assistance data is generated based on the vehicle profile information and crowd-sourced road data associated with the first road segment, (ii) determine at least one vehicle control command based on the received vehicle assistance data, and (iii) adjust a vehicle parameter of the first vehicle based on the vehicle control command.

16. The in-vehicle computing system of claim 15, further comprising a notification module to generate, in response to receiving the vehicle assistance data, a notification for a driver of the first vehicle that includes information related to the vehicle assistance data.

17. The in-vehicle computing system of claim 15, wherein the vehicle output module is to:
receive cruise control data, and
adjust the vehicle parameter comprises adjusting, by the in-vehicle computing system, a throttle of an engine of the first vehicle based on the cruise control data.

18. The in-vehicle computing system of claim 15, wherein the vehicle output module is to:
receive refueling prediction data that estimates a distance the first vehicle can travel before a refueling is required, and
adjust a throttle of an engine of the first vehicle based on the cruise control data.

19. The in-vehicle computing system of claim 15, wherein the vehicle output module is to:
receive road condition data, from the vehicle assistance server, indicative of one or more road conditions of the first road segment; and
generate a notification to inform a driver of the first vehicle about the one or more road conditions.

20. The in-vehicle computing system of claim 19, wherein the vehicle output module is to receive road grade data indicative of a vertical change in elevation along the first road segment from the vehicle assistance server.

* * * * *